(12) United States Patent
Nishina

(10) Patent No.: US 7,133,220 B2
(45) Date of Patent: Nov. 7, 2006

(54) LENS FOR READING AN ORIGINAL, METHOD AND APPARATUS FOR READING AN ORIGINAL, AND IMAGE FORMING APPARATUS

(75) Inventor: Kiichiro Nishina, Ohta-ku (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 11/072,255

(22) Filed: Mar. 7, 2005

(65) Prior Publication Data

US 2005/0152048 A1 Jul. 14, 2005

Related U.S. Application Data

(63) Continuation of application No. 10/633,724, filed on Aug. 5, 2003.

(30) Foreign Application Priority Data

Aug. 5, 2002 (JP) .............................. 2002-226928

(51) Int. Cl.
G02B 9/36 (2006.01)
(52) U.S. Cl. ........................ 359/775; 359/768; 359/715
(58) Field of Classification Search ........ 359/754–757, 359/763–765, 771–772, 775–776, 708, 713–716, 359/767–768
See application file for complete search history.

(56) References Cited

U.S. PATENT DOCUMENTS

| | | | |
|---|---|---|---|
| 4,390,251 A | 6/1983 | Kato | |
| 4,690,518 A | 9/1987 | Kouchiwa et al. | |
| 4,738,517 A | 4/1988 | Nishina et al. | |
| 4,753,522 A | 6/1988 | Nishina et al. | |
| 4,803,498 A * | 2/1989 | Aharon ....................... 347/259 | |
| 4,836,664 A | 6/1989 | Nishina et al. | |
| 4,997,265 A | 3/1991 | Nishina et al. | |
| 5,311,364 A | 5/1994 | Kanoshima et al. | |
| 5,341,245 A * | 8/1994 | Tamagawa et al. ......... 359/739 |
| 5,528,428 A | 6/1996 | Ohtake et al. | |
| 5,636,067 A | 6/1997 | Shimizu | |
| 5,680,254 A | 10/1997 | Ueda et al. | |
| 5,731,915 A | 3/1998 | Noda | |
| 5,781,324 A | 7/1998 | Nishina | |
| 5,999,330 A * | 12/1999 | Goosey, Jr. ................. 359/689 |
| 6,111,703 A | 8/2000 | Hozumi | |
| 6,163,414 A | 12/2000 | Kikuchi et al. | |
| 6,208,474 B1 * | 3/2001 | Kondo ....................... 359/775 |
| 6,445,513 B1 | 9/2002 | Sato | |
| 6,490,102 B1 | 12/2002 | Huang | |
| 6,747,818 B1 | 6/2004 | Ohashi et al. | |
| 2002/0101665 A1 | 8/2002 | Ihashi et al. | |
| 2002/0135890 A1* | 9/2002 | Tochigi ...................... 359/757 |

FOREIGN PATENT DOCUMENTS

| | | |
|---|---|---|
| JP | 6-109971 | 4/1994 |
| JP | 07-294810 | * 11/1995 |
| JP | 10-68881 | 3/1998 |
| JP | 10-253881 | 9/1998 |
| JP | 11-109221 | 4/1999 |

* cited by examiner

*Primary Examiner*—Jordan M. Schwartz
(74) *Attorney, Agent, or Firm*—Oblon, Spivak, McClelland, Maier & Neustadt, P.C.

(57) ABSTRACT

A lens for reading an original, comprises five lenses as a whole including two positive and two negative lenses, an aspherical surface provided on at least one surface of the five lenses, a construction of four lens groups for five lenses which include a cemented lens constructed by cementing one of the positive lenses and one of the negative lenses, an aperture stop disposed between a second and third lens groups, and the cemented lens disposed adjacent to the aperture stop.

5 Claims, 16 Drawing Sheets

LENS FOR READING AN ORIGINAL, METHOD AND APPARATUS FOR READING AN ORIGINAL, AND IMAGE FORMING APPARATUS

CROSS-REFERENCE TO RELATED APPLICATIONS

This application is a Continuation of co-pending U.S. patent application Ser. No. 10/633,724, filed Aug. 5, 2003, and claims priority to Japanese Patent Application No. 2002-226928, filed Aug. 5, 2002. The contents of co-pending application Ser. No. 10/633,724 are incorporated herein by reference in its entirety.

BACKGROUND OF THE INVENTION

1. Field of the Invention

The present invention relates to a lens for reading an original, a method and an apparatus for reading an original, and an image forming apparatus.

2. Description of the Prior Art

Conventionally, an apparatus for reading an original has been widely utilized as an original reading unit of a facsimile machine and a digital copying machine, and an image scanner. The apparatus reduces an original image to be read by a lens for reading an original, and converts the original image to a signal by imaging it on a line sensor of a CCD or the like.

When a color original image is read out with a full-color, a 3-line CCD in which a light receiving element having a filter for decomposing colors for red, green, and blue is disposed in three lines on one chip is used, and the color original image is imaged on a light receiving surface of the light receiving element, then the color original image is discomposed into the three primary colors by the filter to convert it to a signal.

Comparing to a photographing lens, for the lens for reading an original used for the device for reading an original, generally, a high contrast in a high spatial frequency area and a substantially 100% of an aperture efficiency until a peripheral portion of a filed angle are required. Moreover, a bright lens in order to achieve a high-speed reading is also demanded.

In order to read the original image accurately, for the lens for reading an original, a number of aberrations should be successfully corrected.

Especially, a distortion is relatively allowed for the photographing lens; however, the distortion should be sufficiently corrected for the lens for reading an original.

In order to read successfully color image information with the full-color, a chromatic aberration for each color as well as a currature of filed should be highly sufficiently corrected because an image of the original image by the lens for reading an original is required to be imaged by coinciding an image-forming position of red, green, and blue toward an optical axis on the light receiving surface of the 3-line CCD.

As the lens for reading an original, a Gauss type of four groups for six lenses has been widely known in the prior art (for example, Japanese Patent Laid-Open Hei6-109971, Hei10-68881, Hei10-253881, and Hei11-109221)

Generally, the Gauss type lens is capable of successfully correcting the currature of field up to about 20 degree of a half filed angle, and reducing a generation of a coma flare even though an aperture is relatively large. As a result, the high contrast in the high spatial frequency area until the peripheral portion of the image surface is able to be received. However, the Gauss type is composed of 6 lenses, which is a lot of numbers of lenses, and contributes to a large external diameter of lens. As a result, it becomes difficult for the lens for reading an original to miniaturize, and also there is a limit for miniaturizing and lowering a cost for the device for reading an original and the image forming apparatus.

SUMMARY OF THE INVENTION

It is, therefore, an object of the present invention to provide a lens for reading an original (hereinafter calls an original reading lens), which meets a plurality of needs requiring for the lens for reading an original such that a F/No is bright about 4.4 to 5.0, an aperture efficiency is substantially 100% until a peripheral portion, aberrations are successfully corrected, a high contrast in a high spatial frequency area is included, and the lens is capable of corresponding to read a full-color original image, although a number of a construction of a lens is small such as four lens groups for five lenses, which is an advantageous for miniaturizing and lowering a cost. The present invention has another object to provide a method for reading an original, a device for reading an original, and an image forming apparatus by use of this lens for reading an original.

The present invention is characterized that it is constructed by five lenses having at least two positive and two negative lenses. At least one plane is an aspherical surface. A construction of the lens is the four lens groups for the five lenses having a cemented lens constructed by cementing one lens of the positive lens and one lens of the negative lens. An aperture stop S is disposed between a second lens and a third lens groups. The cemented lens is disposed adjacent to the aperture stop S.

DETAILED DESCRIPTION OF THE PREFERED EMBODIMENTS

Figure 1:
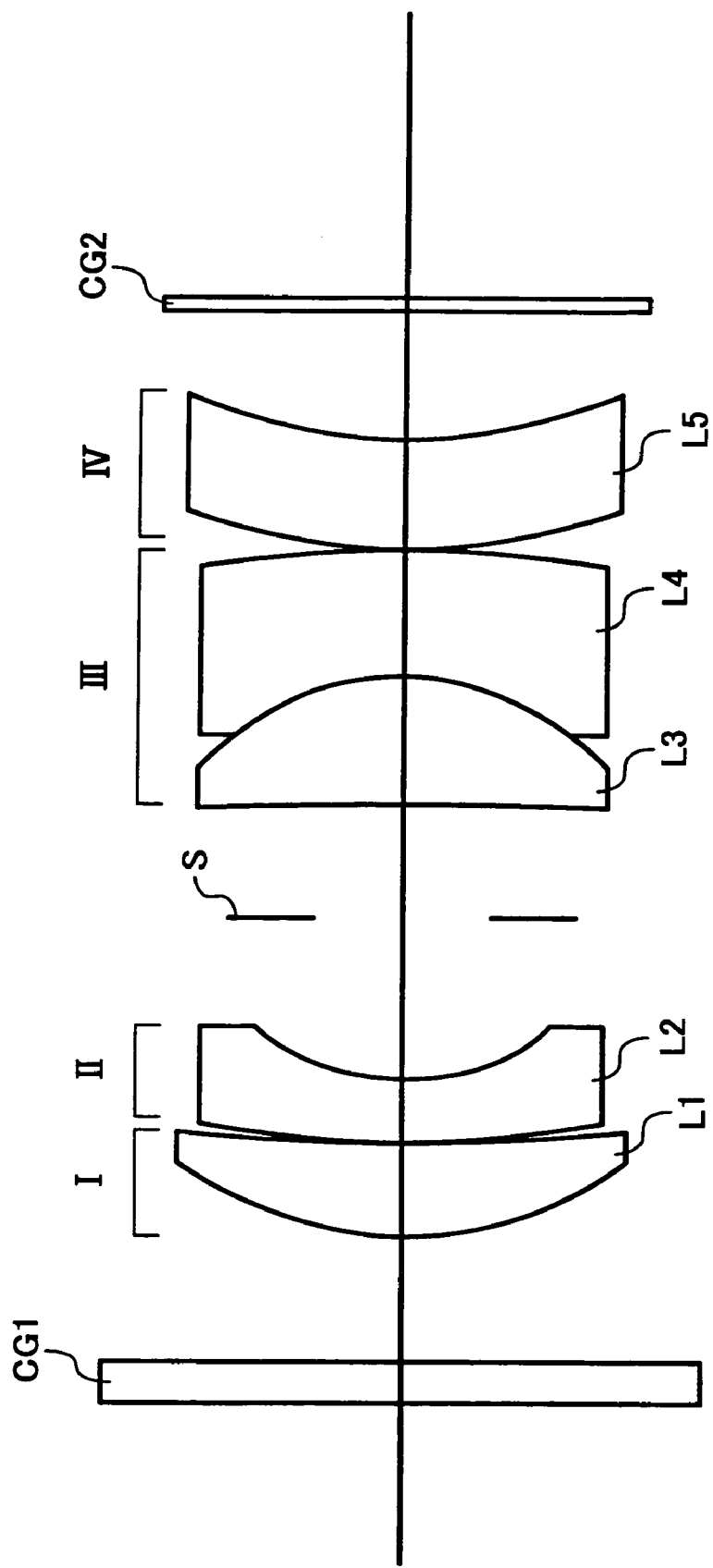
FIG. 1 is a view for explaining a construction of a lens for a first embodiment.

Seven examples will be described below as examples of embodiments for an original reading lens. The embodiments 1 to 4 are examples of a first original reading lens. The first original reading lens is provided with a cemented lens, which is composed of a third lens L3 and a fourth lens L4, and also satisfies any of a condition (1-1)~(3-1) or a condition (1-2)~(3-2).

In order to avoid a complication, in FIGS. 1,3,5,7,9,11, and 13, about a first to a fourth lens groups reference numerals I to IV are used commonly regardless of constitutions of the lenses, and reference numerals L1 to L5 are used commonly regardless of the specific lens forms about a first lens and a fifth lens.

In FIGS. 1,3,5,7,9,11, and 13, a CG1 denotes a contact glass and a CG2 denotes a cover glass of a CCD. The CCD line sensor is a 3-line CCD having a color filter for decomposing a color, and is assumed that a size of a light receiving element is 10 μm and 600 dpi.

Figure 3:
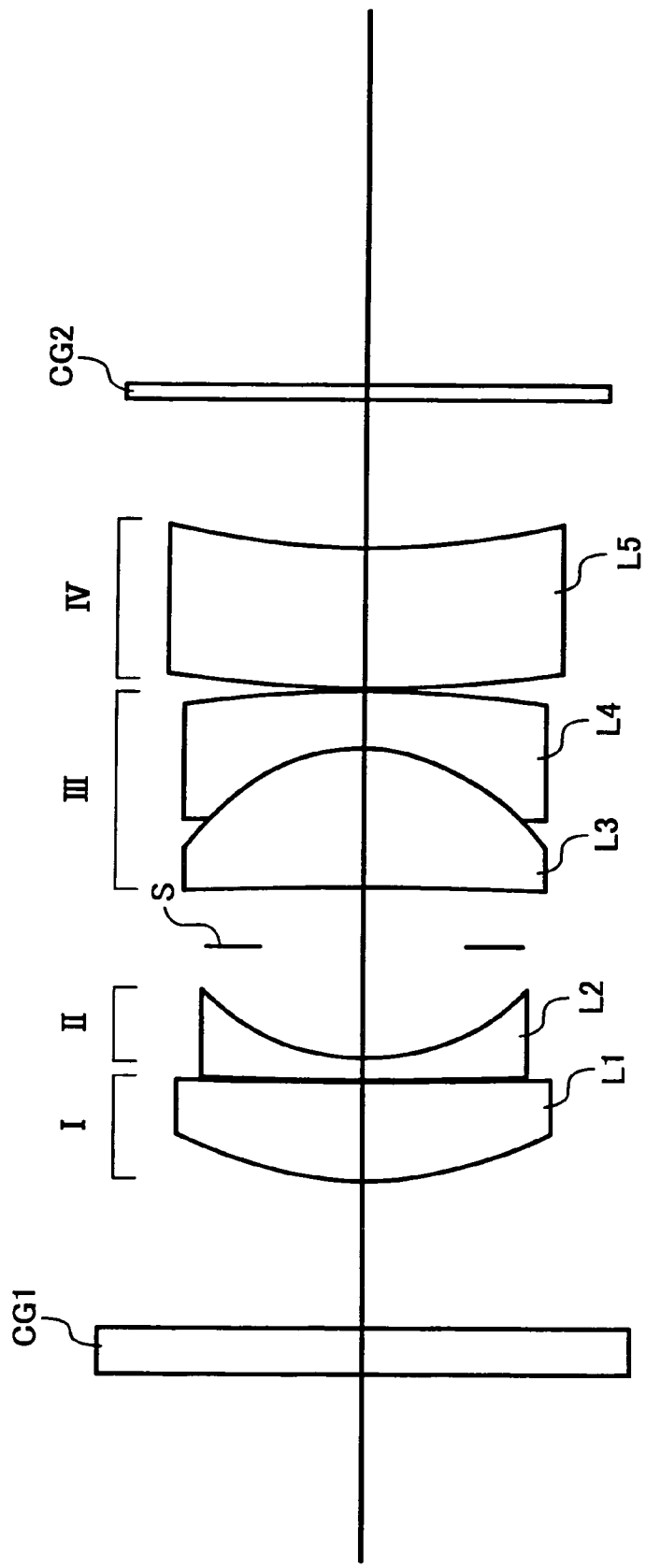
FIG. 3 is a view for explaining a construction of a lens for a second embodiment.
Figure 5:
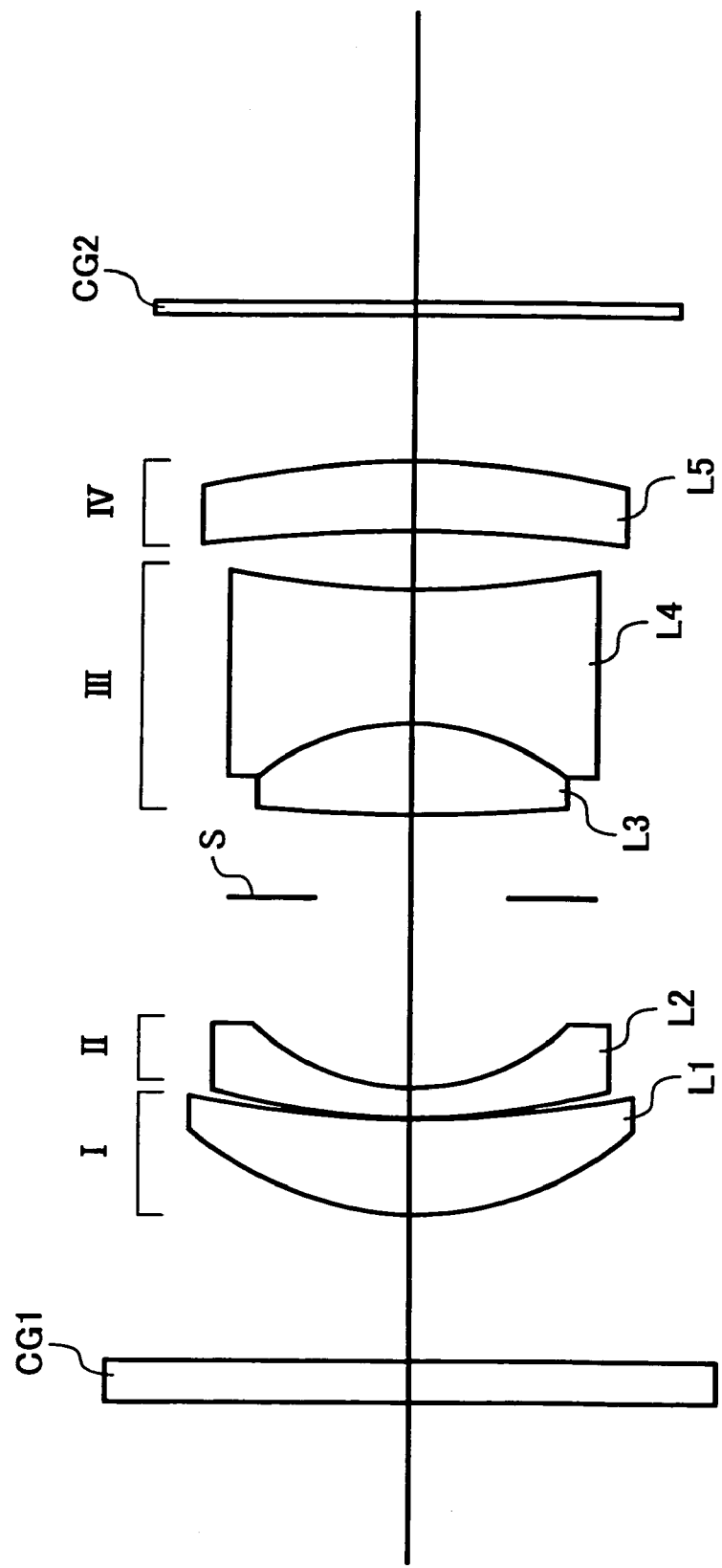
FIG. 5 is a view for explaining a construction of a lens for a third embodiment.
Figure 7:
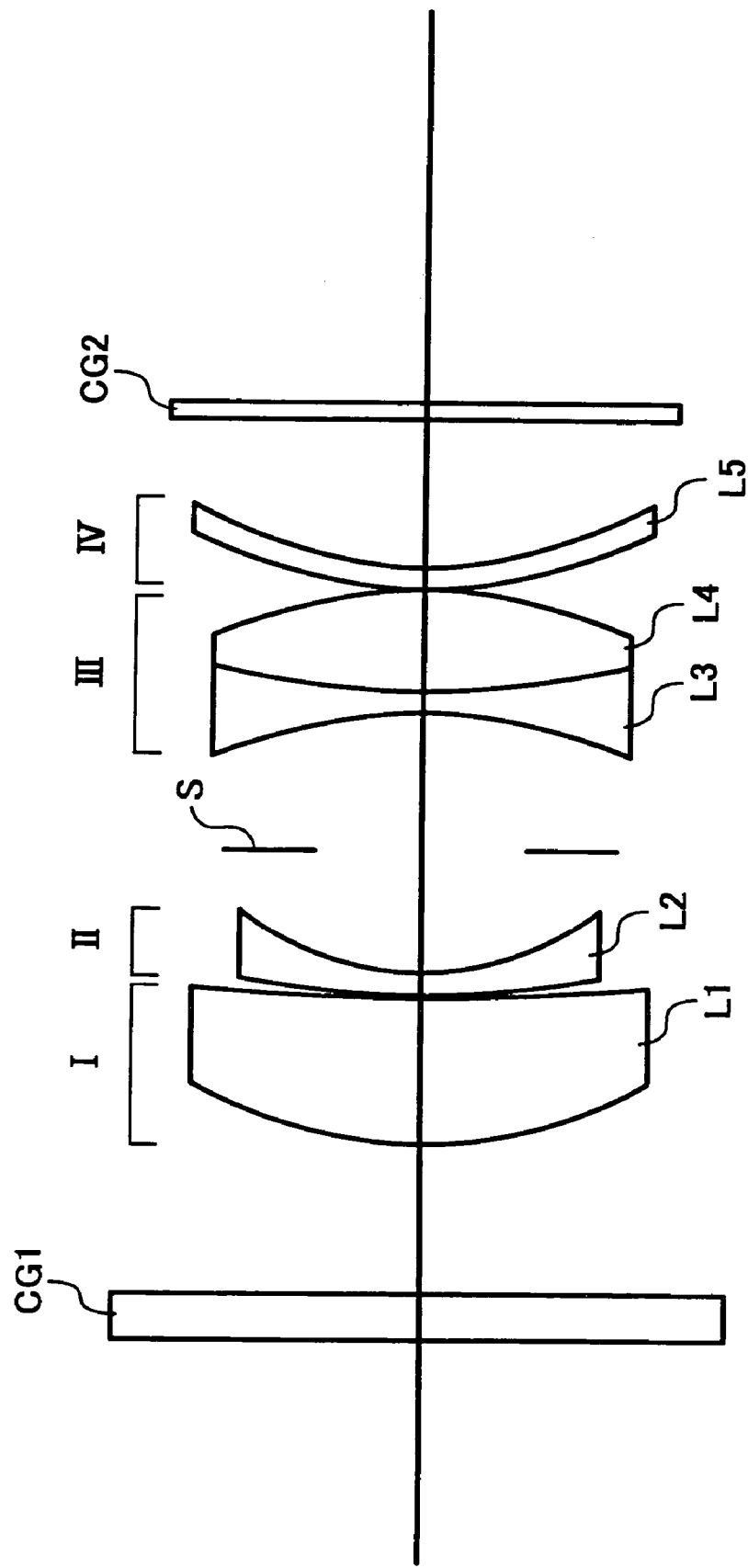
FIG. 7 is a view for explaining a construction of a lens for a fourth embodiment.

FIG. 1 shows a construction of a first embodiment and FIG. 3 shows a construction of a second embodiment. FIG. 5 shows a construction of a third embodiment and FIG. 7 shows a construction of a fourth embodiment.

The embodiments 5 to 7 are examples for a second original reading lens. The second original reading lens is provided with a cemented lens lens, which is composed of a second lens L2 and a third lens L3, and at least one plane of the fourth lens L4 is adopted as an aspherical surface, and the second original reading lens satisfies conditions (1-3)~(3-3).

The embodiment 7 is an example of a third original reading lens. The third original reading lens has an aspherical surface for a convex lens face of the fourth lens L4 in the second original reading lens.

In the each embodiment, all lenses are glass lenses, and the aspherical surface is formed by a glass mold.

Meanings of symbols in the each embodiment are as follows.

f: a combined focal length of an e line of an entire lens system.
F: a F-number
m: a reduced magnification
Y: an object height
ω: s half field angle
r: s curvature radius of each surface (including an aperture stop) from a contact glass to a CCD cover glass.
d: s surface separation of the above mentioned each surface.
nd: a refractive index of a d line
vd: an Abbe's number
ne: a refractive index of an e line
f1: a focal length of an e line of the first lens
n̄⊥: an average of a nd of a lens including a positive refracting power
n̄⊔: an average of a nd of a lens including a negative refracting power
v̄⊥: an average of a vd of a lens including a positive refracting power
v̄⊔: an average of a vd of a lens including a negative refracting power Left side sections in tables showing data of each embodiment are indicators showing each surface. C1 and C2 show surfaces of an object side and an image side of a contact glass, 1 to 10 show each surface (a surface of a lens and a surface of an aperture stop) counting from an object side of a original reading lens, and C3 and C4 show surfaces of an object side and an image side of a CCD cover glass.

The aspherical surface is shown by a known formula below.

$$X = 1/R \cdot Y^2/[1+\sqrt{\{1-1+K \cdot Y/R^2\}} + A4 \cdot Y^4 + A6 \cdot Y^6 + A8 \cdot Y^8 + A10 \cdot Y^{10}]$$

In the above mentioned formula
X: a distance form a tangent plane in an apex of an aspherical surface of the aspherical surface in a height Y from an optical axis.
Y: a height from an optical axis
R: a curvature radius of a paraxial of an aspherical surface
K: a conical constant
A4, A6, A8, A10: an aspherical coefficient in numerical values, for example [E-06] means [$10^{-6}$]

First Embodiment

FIG. 1 shows a construction of a lens of the first embodiment. The original reading lens of FIG. 1 has a first to a fourth lens groups sequentially arranged from an object side (a left side of FIG. 1); the first lens group I is composed of a first lens L1 having a positive refracting power; the second lens group II is composed of a second lens having a negative refracting power; an aperture stop S is disposed between the second lens group and the third lens group; the third lens group III having a positive refracting power is composed of a cemented lens, which is constructed by cementing a third lens L3 and a fourth lens L4; and the fourth lens group IV is composed of a fifth lens L5 having a positive or a negative refracting power.

In this original reading lens, the cemented lens is constructed by the third and the fourth lenses. The third lens L3 is a positive lens and the fourth lens L4 is a negative lens. The fifth lens L5 is a negative lens.

As showing in FIG. 1, in this original reading lens, the first lens L1 is a positive meniscus lens arranging a convex face directed to the object side. The second lens L2 is a negative meniscus lens arranging a concave face directed to the object side. Moreover, at least one surface of the first lens L1 is able to be the aspherical surface.

The third lens L3 as the positive lens in particular is a positive meniscus lens arranging a concave face directed to the object side. The fourth lens L4 as the negative lens in particular is a negative meniscus lens arranging a concave face directed to the object side. The cemented lens in FIG. 1 has the positive refracting power.

(A Second Construction Example of the Cemented Lens)

The cemented lens of the above original reading lens is able to be constructed that the third lens L3 is the negative lens and the fourth lens L4 is the positive lens as showing the example in FIG. 7. The third lens L3 of the negative lens constructing the cemented lens in particular is able to be a double-concave lens (FIG. 7), and the fourth lens L4 of the positive lens is able to be a double-convex lens (FIG. 7).

(A Construction of the Fifth Lens)

The fifth lens L5 as the negative lens in the above original reading lens is the negative meniscus lens having the convex face directed to the object side.

(A First Condition of the Original Reading Lens)

In this original reading lens, a combined focal length f with respect to an e line of an entire lens system, a focal length f1 with respect to an e line of the first lens counted from the object side, averages $n_+$ and $n_-$ of positive and negative lenses in a refractive index with respect to a d line of a lens material, and averages of $v_+$ and $v_-$ of positive and negative lenses of an Abbe's number of a lens material satisfy following conditions.

$$0.3 < f1/f < 1.2 \quad (1\text{-}1)$$

$$-0.18 < n_+ - n_- < 0.18 \quad (2\text{-}1)$$

$$0.88 < v_+ - v_- < 35.0 \quad (3\text{-}1)$$

The aforementioned $n_+$ is the average of the refractive index of each material for two or three positive lenses, which are included in the five lenses. In other word, provided the number of the positive lens as Np (=2 or 3), and when the refractive index of the material of these positive lenses is adopted as $n_+i$ (i=1~Np), $n_+$ is defined as $n_+ = \Sigma n_+ i/Np$. In $n_-$ provided the number of the negative lens in the five lenses as Np (=2 or 3), when the refractive index of material of each negative lens is adopted as $n_-j$ (j=1~Nn), $n_-$ is defined as $n_- = \Sigma n_- j/Nn$. $v_+$ and $v_-$ are defined as $v_+ = \Sigma v_+ i/Np$ and $v_- = \Sigma v_- j/Nn$ as well. $v_+ i$ and $v_- j$ are the Abbe's number of the material of each positive and negative lens, and a sum is conducted about the above i and j.

The above condition (1-1) is to determine a power of the first lens group with respect to the entire lens system. The original reading lens is an optical system in which a real image is imaged. Therefore, the focal length f of the entire lens system is a positive, and a focal length f1 of the first group is positive under the condition (1-1).

If the power exceeds 1.2, which is an upper limit of the condition (1-1), the power of the first lens group becomes too weak, and as a result, the positive lens constructing the first lens group becomes too big, and it results in increasing a cost. Moreover, if the power exceeds 0.3, which is a lower limit of the condition (1-1), it is advantageous for downsizing the original reading lens, but a coma flare becomes larger.

As described above, this original reading lens is constructed by four lens groups for five lenses, and the aperture stop is arranged between the second lens group and the third lens group. The cemented lens is disposed adjacent to this aperture stop. The cemented lens is cemented by the positive and the negative lenses.

When image information of an original is read, a requirement for correcting a distortion is strict. However, in the original reading lens of this embodiment, the aperture stop is arranged between the second and the third lens groups, and the cemented lens is disposed adjacent to this aperture stop. Moreover, by the above conditions (1-1), (2-1), and (3-1), a distribution of the power in the vicinity of the aperture stop is successfully balanced, and the strict requirement for correcting the above distortion is satisfied. A chromatic aberration is also successfully collected by use of the cemented lens.

(A Second Condition of the Original Reading Lens)

In the above described original reading lens, a further favorable optical performance is able to be achieved in such a manner that the above f, f1, $n_+$, $n_-$, $v_+$, and $v_-$ satisfy following conditions.

$$0.40 < f1/f < 0.57 \quad (1\text{-}2)$$

$$0.08 < n_+ - n_- < 0.14 \quad (2\text{-}2)$$

$$3.47 < v_+ - v_- < 19.49 \quad (3\text{-}2)$$

The above mentioned condition (2-1) is to decide a range of the refractive index of the + lens and − lens constructing the original reading lens. If the refractive index exceeds 0.18 of an upper limit, the refractive index as an entire + lens becomes much bigger than the refractive index as an entire − lens, and Petzval's sum becomes too small. As a result, the image surface is inclined to a positive side and, and a curvature becomes big. On the other hand, if the refractive index exceeds −0.18 of a lower limit, Petzval's sum becomes too big. As a result, the image surface is inclined to the negative side, and astigmatism becomes larger. Therefore, a favorable performance of imaging in an entire screen becomes difficult to be received beside the range of the condition (2-1).

The original reading lens can achieve a further favorable performance by satisfying the conditions (1-2)~(3-2) in which the conditions are slightly narrower than the above conditions (1-1)~(3-1).

Table 1 shows data of the first embodiment.

TABLE 1

| f = 80.404, | F = 4.36, | m = 0.23622, | Y = 152.4, | ω = 19.9° |
|---|---|---|---|---|
| | r | d | nd | vd | ne |
| c1 | 0.000 | 3.200 | 1.51680 | 64.2 | 1.51872 |
| c2 | 0.000 | | | | |
| 1 | 28.366 | 7.385 | 1.76800 | 49.2 | 1.77172 |
| 2 | 152.845 | 0.100 | | | |
| 3 | 94.484 | 4.994 | 1.60398 | 34.47 | 1.60813 |
| 4 | 19.183 | 12.664 | | | |
| 5 | 0.0 (aperture stop) | 8.665 | | | |
| 6 | −581.430 | 10.000 | 1.81600 | 46.6 | 1.82016 |
| 7 | −21.428 | 10.000 | 1.64769 | 33.84 | 1.65222 |
| 8 | −94.796 | 0.100 | | | |
| 9 | 50.767 | 8.383 | 1.84700 | 23.8 | 1.85540 |
| 10 | 42.885 | | | | |
| c3 | 0.000 | 1.000 | 1.51680 | 64.2 | 1.51872 |
| c4 | 0.000 | | | | |

Table 2 shows a conical constant and an aspherical coefficient of an aspherical surface for the first embodiment.

TABLE 2

| | < aspherical coefficient > | | | | |
|---|---|---|---|---|---|
| surface number | K | A4 | A6 | A8 | A10 |
| 1 | −0.53613 | 9.4038E−07 | 1.8022E−09 | −7.165E−12 | 8.33E−15 |

Table 3 shows values of parameters of each condition in the first embodiment.

TABLE 3

| Item | Value |
|---|---|
| < values of condition formulas > | |
| f1 | 43.995 |
| f1/f | 0.547 |
| $n_a - n_{bd}$ | 0.092 |
| $v_a - v_{bd}$ | 17.20 |

As describing in table 3, the original reading lens of the first embodiment satisfies the above conditions (1-1), (2-1), and (3-1) and the conditions (1-2), (2-2), and (3-2).

Figure 2:
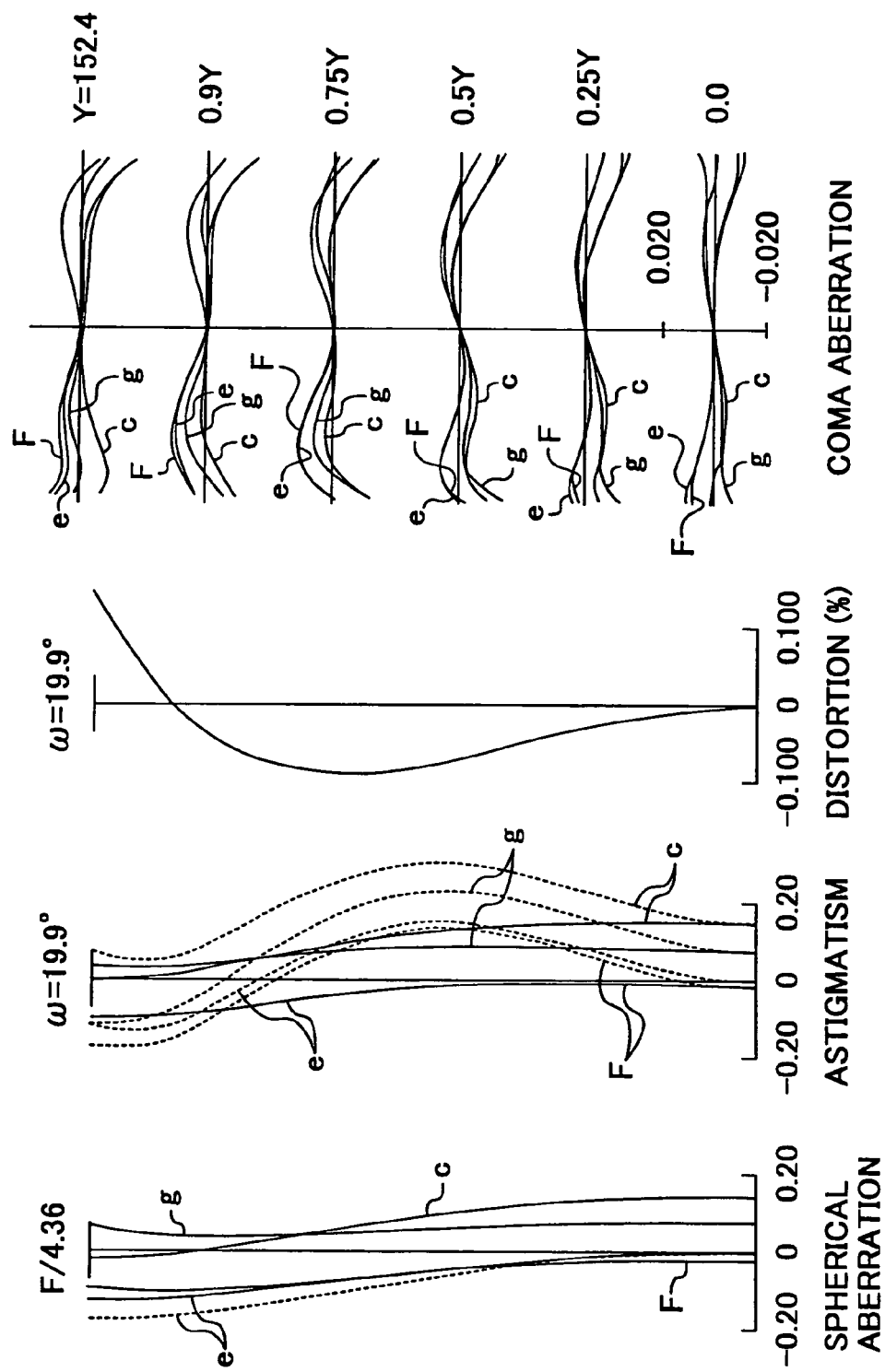
FIG. 2 is a view for showing some aberrations for the first embodiment.

FIG. 2 shows a view for some aberrations about the first embodiment.

In a view of a spherical aberration, a dotted line shows a sin condition. In a view of astigmatism, solid lines show sagittal rays, and dotted lines show meridional rays. e shows e line (546.07 nm), g shows a g line (436.83 nm), c shows c line (656.27 nm), and F shows F line (486.13 nm). These are the same views for the same aberrations for other embodiments from 2 to 7.

Second Embodiment

FIG. 3 shows a construction of a lens for the second embodiment. The original reading lens as describing in FIG. 3 has a first to a fourth lens groups sequentially arranged from an object side; a first lens group I is composed of a first lens L1 having a positive refracting power; a second lens group II is composed of a second lens L2 having a negative refracting power; an aperture stop S is disposed between the second and the third lens groups; a third lens group III having a positive refracting power is composed of a cemented lens, which are constructed by cementing a third lens L3 and a fourth lens L4; and a fourth lens group IV is composed of a fifth lens L5.

In the cemented lens of the third lens group III, the third lens L3 is a positive lens and the fourth lens L4 is a negative lens. The fifth lens L5 is a negative lens.

In the original reading lens of FIG. 3, the first lens L1 is a positive meniscus lens arranging a convex face directed to the object side. Moreover, at least one surface of the first lens L1 is able to be an aspherical surface. The second lens L2 can be a negative meniscus lens arranging a concave face directed to the object side.

The third lens L3 as the positive lens is able to be a positive meniscus lens arranging a convex face directed to the object side. The fourth lens as the negative lens is able to be a negative meniscus lens arranging a concave face directed to the object side. In this case, the cemented lens of the third lens group III has the positive refracting power.

The fifth lens L5 in the original reading lens of FIG. 3 is able to be a negative meniscus lens arranging a convex face directed to the object side as showing in FIG. 3.

Table 4 shows data in the second embodiment.

TABLE 4 f = 80.643, F = 4.96, m = 0.23622, Y = 152.4, ω = 19.9°

| | r | d | nd | vd | ne |
|---|---|---|---|---|---|
| c1 | 0.000 | 3.200 | 1.51680 | 64.2 | 1.51872 |
| c2 | 0.000 | | | | |
| 1 | 24.816 | 6.775 | 1.74330 | 49.33 | 1.74689 |
| 2 | 620.577 | 0.100 | | | |
| 3 | 168.619 | 1.500 | 1.59551 | 39.22 | 1.59911 |
| 4 | 16.188 | 7.297 | | | |
| 5 | 0.0 (aperture stop) | 4.142 | | | |
| 6 | −225.417 | 9.382 | 1.71300 | 53.94 | 1.71615 |
| 7 | −14.284 | 3.993 | 1.54814 | 45.82 | 1.55098 |
| 8 | −73.804 | 0.100 | | | |
| 9 | 90.254 | 9.412 | 1.64769 | 33.84 | 1.65222 |
| 10 | 60.644 | | | | |
| c3 | 0.000 | 1.000 | 1.51680 | 64.2 | 1.51872 |
| c4 | 0.000 | | | | |

Table 5 shows a conical constant and an aspherical coefficient of an aspherical surface.

TABLE 5

| surface number | K | A4 | A6 | A8 | A10 |
|---|---|---|---|---|---|
| < aspherical coefficient > | | | | | |
| 1 | −0.58442 | −5.4490E−07 | −7.06818E−09 | −1.70944E−11 | −1.00091E−14 |

Table 6 shows values of parameters of conditions in the second embodiment.

TABLE 6

| Item | Value |
|---|---|
| < values of conditions formulas > | |
| f1 | 34.443 |
| f1/f | 0.427 |
| $n_a - n_{bd}$ | 0.118 |
| $v_a - v_{bd}$ | 5.76 |

Figure 6:
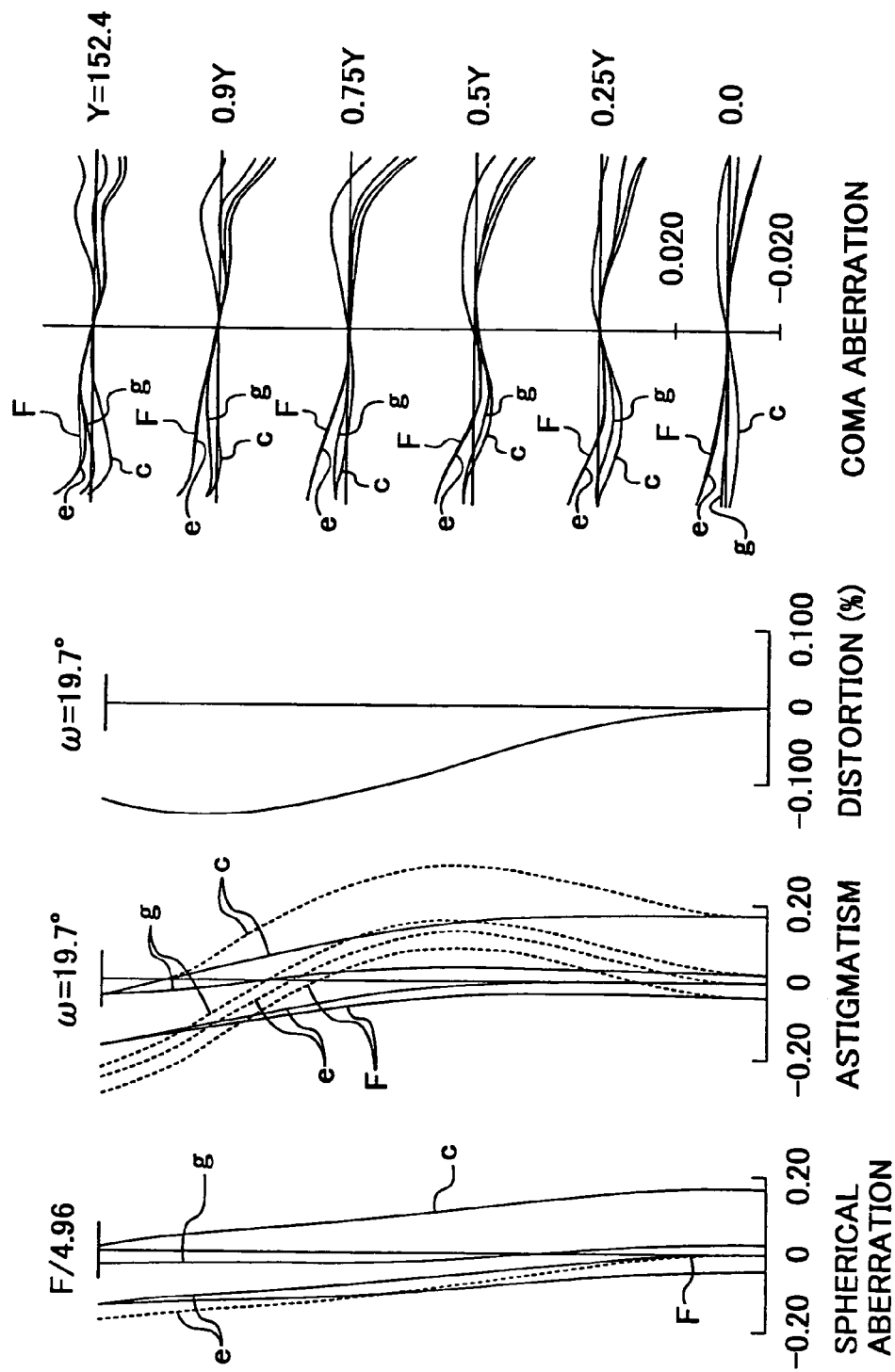
FIG. 6 is a view for showing some aberrations for the third embodiment.

As shown in FIG. 6, the original reading lens of the second embodiment satisfies the above conditions (1-1),(2-1), and (3-1) and the conditions (1-2),(2-2), and (3-2).

Figure 4:
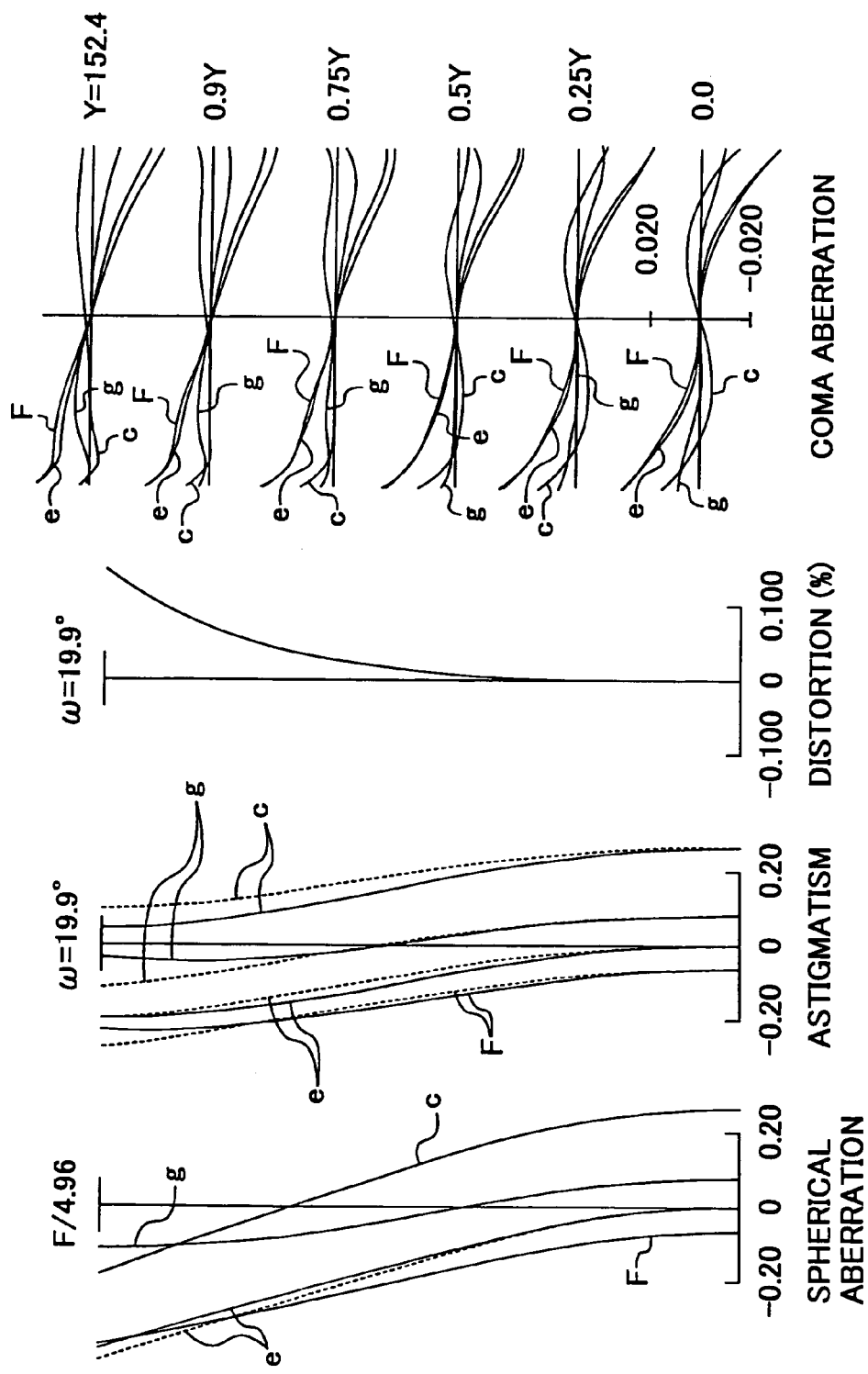
FIG. 4 is a view for showing some aberrations for the second embodiment.

FIG. 4 shows a view for some aberrations in the second embodiment.

(Third Embodiment)

FIG. 5 shows a construction of a lens of the third embodiment. The original reading lens shown in FIG. 5 has a first to a fourth lens groups sequentially arranged from an object side (a left side of FIG. 5); the first lens group I is composed of the first lens L1 having a positive refracting power; the second lens group II is composed of the second lens L2 having a negative refracting power; the aperture stop S is disposed between the second and the third lens groups; the third lens group III having a positive refracting power is composed of a cemented lens, which is constructed by cementing a third lens L3 and a fourth lens L4; and the fourth lens group IV is composed of the fifth lens L5 having a positive or a negative refracting power.

In the original reading lens in FIG. 5, the first lens L1 is able to be a positive meniscus lens arranging a convex face directed to the object side, and the second lens L2 is able to be a negative meniscus lens arranging a convex face directed to the object side. Moreover, in the original reading lens, at least one surface of the first lens L1 is able to be an aspherical surface.

In the FIG. 5, the third lens L3 constructing the cemented lens of the third lens group III is the positive lens, and the fourth lens L4 is the negative lens. The third lens L3 as the positive lens is set to be a double-convex lens. The fourth L4 as the negative lens is set to be a double-concave lens. In this case, the cemented lens of the third lens group III has the positive refracting power.

The fifth lens L5 in FIG. 5 is set to be a positive meniscus lens arranging a concave face directed to the object side.

Table 7 shows data of the third embodiment.

TABLE 7

| f = 81.503, | F = 4.96, | m = 0.23622, | Y = 152.4, | ω = 19.7° |
|---|---|---|---|---|
| | r | d | nd | vd | ne |

| | r | d | nd | vd | ne |
|---|---|---|---|---|---|
| c1 | 0.000 | 3.200 | 1.51680 | 64.2 | 1.51872 |
| c2 | 0.000 | | | | |
| 1 | 23.142 | 6.340 | 1.78881 | 41.63 | 1.79331 |
| 2 | 70.027 | 0.100 | | | |
| 3 | 50.803 | 2.070 | 1.64510 | 31.35 | 1.64997 |
| 4 | 15.872 | 13.179 | | | |
| 5 | 0.0 (aperture stop) | 5.919 | | | |
| 6 | 115.786 | 6.180 | 1.80901 | 39.52 | 1.81387 |
| 7 | −16.873 | 9.346 | 1.64769 | 33.84 | 1.65222 |
| 8 | 67.873 | 3.927 | | | |
| 9 | −104.080 | 4.959 | 1.71300 | 53.9 | 1.71615 |
| 10 | −52.467 | | | | |
| c3 | 0.000 | 1.000 | 1.51680 | 64.2 | 1.51872 |
| c4 | 0.000 | | | | |

Table 8 shows a conical constant and an aspherical coefficient of an aspherical surface.

TABLE 8

< aspherical coefficient >

| surface number | K | A4 | A6 | A8 | A10 |
|---|---|---|---|---|---|
| 1 | −0.47345 | 2.37697E−06 | 5.34943E−09 | −1.17279E−11 | 2.60656E−14 |
| 6 | −11.0046 | −8.63490E−07 | −1.47483E−08 | 1.29599E−10 | −5.45254E−13 |

Table 9 shows values of parameters of conditions in the third embodiment.

TABLE 9

< values of conditions formulas >

| Item | Value |
|---|---|
| f1 | 41.112 |
| f1/f | 0.504 |

TABLE 9-continued

< values of conditions formulas >

| Item | Value |
|---|---|
| $n_a - n_{bd}$ | 0.109 |
| $v_a - v_{bd}$ | 11.83 |

Figure 9:
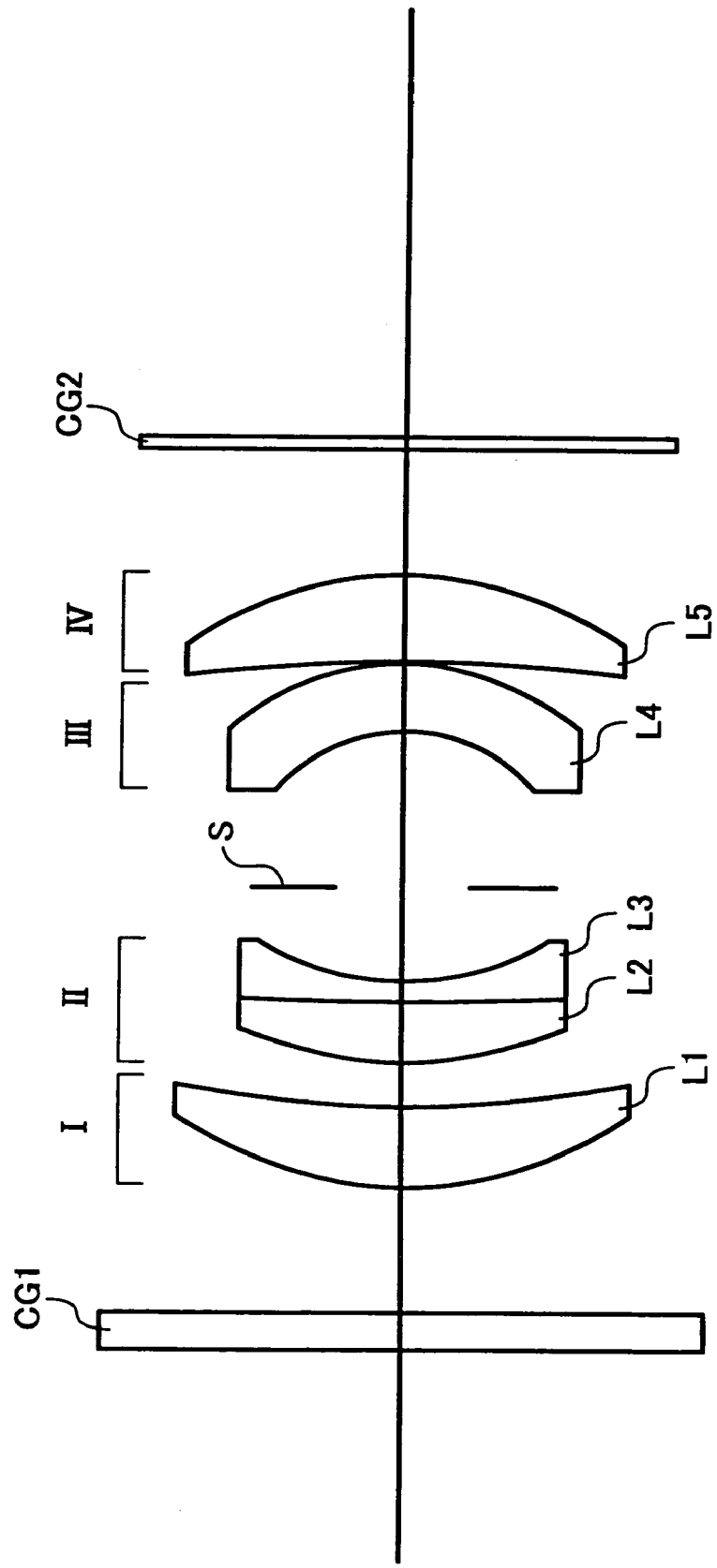
FIG. 9 is a view for explaining a construction of a lens for a fifth embodiment.

As shown in FIG. 9, the original reading lens of the third embodiment satisfies the above conditions (1-1), (2-1), and (3-1), and the conditions (1-2), (2-2), and (3-2).

FIG. 6 shows a view for some aberrations in the third embodiment.

(Fourth Embodiment)

FIG. 7 shows a constitution of a lens of the fourth embodiment. The original reading lens of FIG. 7 has a first to a fourth lens groups sequentially arranged from an object side; the first lens group I is composed of the first lens L1 having a positive refracting power; the second lens group II is composed of the second lens L2 having a negative refracting power; an aperture stop S is disposed between the second and the third lens groups; the third lens group III having a positive refracting power is composed of a cemented lens, which is constructed by cementing the third lens L3 and the fourth lens L4; and the fourth lens group is composed of the fifth lens L5 having a negative refracting power.

In this original reading lens, the cemented lens is constructed by the third lens L3 and the fourth lens L4. The third lens L3 is a negative lens composed of a double-concave lens and the forth lens L4 is a positive lens composed of a double-convex lens. The cemented lens of the third group III has the positive refracting power. The fifth lens L5 is the negative lens.

In the original reading lens of FIG. 7, in particular, the first lens L1 is able to be a positive meniscus lens arranging a convex face directed to the object side. The second lens L2 is able to be a negative meniscus lens arranging a convex face directed to the object side. Moreover, in the above mentioned original reading lens, at least one surface of the first lens L1 is able to be an aspherical surface.

Table 10 shows data of the fourth embodiment.

TABLE 10

| f = 81.814, | F = 4.46, | m = 0.23622, | Y = 152.4, | ω = 19.6° |
|---|---|---|---|---|

| | r | d | nd | vd | ne |
|---|---|---|---|---|---|
| c1 | 0.000 | 3.200 | 1.51680 | 64.2 | 1.51872 |
| c2 | 0.000 | | | | |
| 1 | 29.118 | 10.000 | 1.81661 | 45.7 | 1.82086 |
| 2 | 271.007 | 0.100 | | | |
| 3 | 74.199 | 1.500 | 1.70285 | 32.61 | 1.70795 |

TABLE 10-continued

| | | | | | |
|---|---|---|---|---|---|
| 4 | 19.049 | 8.347 | | | |
| 5 | 0.0 (aperture stop) | 9.502 | | | |
| 6 | −36.761 | 1.500 | 1.59300 | 35.5 | 1.59696 |
| 7 | 54.704 | 6.927 | 1.81600 | 46.6 | 1.82016 |
| 8 | −33.591 | 0.100 | | | |
| 9 | 34.759 | 1.500 | 1.82666 | 34.84 | 1.83228 |
| 10 | 31.560 | | | | |
| c3 | 0.000 | 1.000 | 1.51680 | 64.2 | 1.51872 |
| c4 | 0.000 | | | | |

Table 11 shows a conical constant and an aspherical coefficient an aspherical surface.

TABLE 11

< aspherical coefficient >

| surface number | K | A4 | A6 | A8 | A10 |
|---|---|---|---|---|---|
| 1 | −0.61636 | 1.83234E−07 | 1.51715E−09 | −1.87652E−11 | 3.0198E−14 |

Table 12 shows values of parameters of conditions in the fourth embodiment.

TABLE 12

< values of condition formulas >

| Item | Value |
|---|---|
| f1 | 39.016 |
| f1/f | 0.477 |
| $n_A - n_B$ | 0.131 |
| $v_A - v_B$ | 12.01 |

As shown in table 12, the original reading lens of FIG. 7 satisfies the above conditions of lens (1-1), (2-1), and (3-1), and conditions of lens (1-2), (2-2), and (3-2).

Figure 8:
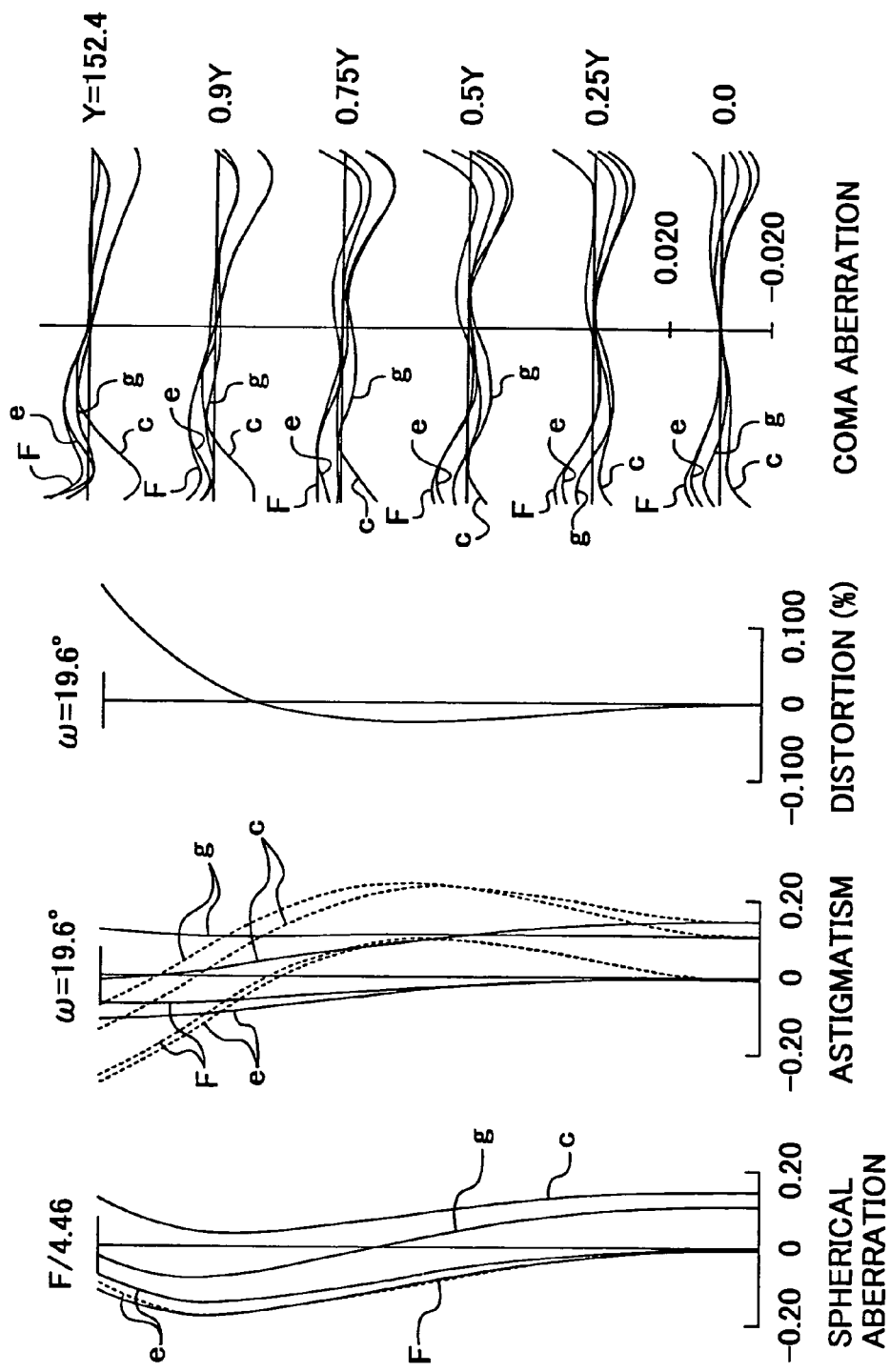
FIG. 8 is a view for showing some aberrations for the fourth embodiment.

FIG. 8 shows a view for some aberrations in the fourth embodiment.

(Fifth Embodiment)

FIG. 9 shows a lens constitution of an original reading lens in the fifth embodiment.

The original reading lens of the fifth embodiment shown in FIG. 9 has a first to a fourth lens groups sequentially arranged from an object side; a first lens group I is composed of a first lens L1 having a positive refracting power; a second lens group II having a negative refracting power is composed of a cemented lens, which is constructed by cementing a second lens L2 having a positive refracting power and a third lens L3 having a negative refracting power; an aperture stop S is disposed between the second and the third lens groups; a third lens group III is composed of a fourth lens L4 having a negative refracting power; and a fourth lens group IV is composed of a fifth lens L5 having a positive refracting power.

The original reading lens as shown in FIG. 9 is different from the original reading lens as shown in FIG. 1 in that the second lens group II is constructed by the cemented lens having the negative refracting power, and the fourth lens L4 of the third lens group III has the negative refracting power. When the second lens group of the original reading lens is adopted as the cemented lens, the second lens L2 and the third lens L3 composing the cemented lens of the second lens are able to be meniscus lenses arranging convex faces directed to the object side as showing FIGS. 9, 11, and 13.

In the original reading lens as shown in FIG. 9, at least one surface of the fourth lens L4 is able to be an aspherical surface.

In the original reading lens shown in FIG. 9, if the above mentioned f, f1, $n_A$, $n_B$, $v_A$, and $v_B$ satisfy the following conditions, a further successful optics performance is able to be achieved.

$$0.54 < f1/f < 1.14 \quad (1\text{-}3)$$

$$-0.16 < n_A - n_B < 0.05 \quad (2\text{-}3)$$

$$18.11 < v_A - v_B < 32.13 \quad (3\text{-}3)$$

The above mentioned condition (3-1) is the condition for correcting a chromatic aberration on an axis. If the condition exceeds 35.0 of an upper limit, the chromatic aberration on the axis is over corrected, and the chromatic aberration on the axis becomes large to a positive side in a short wavelength side than a dominant wave length. If the condition exceeds 0.88 of a lower limit, the chromatic aberration on the axis becomes large to a negative side in the short wavelength side than the dominant wave length.

When the original reading lens has the second lens as the cemented lens and the convex face of the fourth lens as the aspherical surface, as conditions to have a successful performance for imaging with a compact and a low cost, a further successful performance is able to be received by satisfying conditions of (1-3)~(3-3), which is the slight narrower conditions than the conditions (1-1)~(3-1).

Table 13 shows data of the fifth embodiment.

TABLE 13

| f = 84.532, | F = 5.01, | m = 0.23622, | Y = 152.4, | ω = 19.0° |
|---|---|---|---|---|
| | r | d | nd | vd | ne |
| c1 | 0.000 | 3.200 | 1.51680 | 64.2 | 1.51872 |
| c2 | 0.000 | | | | |
| 1 | 31.051 | 6.403 | 1.83400 | 37.3 | 1.83930 |
| 2 | 93.332 | 3.269 | | | |
| 3 | 30.621 | 4.787 | 1.48700 | 70.4 | 1.48866 |
| 4 | 475.204 | 1.500 | 1.70959 | 27.97 | 1.71559 |
| 5 | 20.376 | 7.645 | | | |
| 6 | 0.0 (aperture stop) | 12.193 | | | |
| 7 | −14.634 | 5.433 | 1.84700 | 23.8 | 1.85540 |
| 8 | −20.700 | 0.100 | | | |
| 9 | −130.896 | 6.825 | 1.62286 | 60.34 | 1.62533 |
| 10 | −29.219 | | | | |
| c3 | 0.000 | 1.000 | 1.51680 | 64.2 | 1.51872 |
| c4 | 0.000 | | | | |

Table 14 shows a conical constant and an aspherical coefficient an aspherical surface.

TABLE 14

< aspherical coefficient >

| surface number | K | A4 | A6 | A8 | A10 |
|---|---|---|---|---|---|
| 7 | 0.22916 | 5.60667E−06 | 1.22914E−07 | −9.83972E−10 | 7.57302E−12 |

Table 15 shows values of parameters of conditions in the embodiment 5.

TABLE 15

< values of conditions formulas >

| Item | Value |
|---|---|
| f1 | 52.956 |
| f1/f | 0.626 |
| $n_{\text{凸}} - n_{\text{凹}}$ | −0.130 |
| $\nu_{\text{凸}} - \nu_{\text{凹}}$ | 30.13 |

Figure 10:
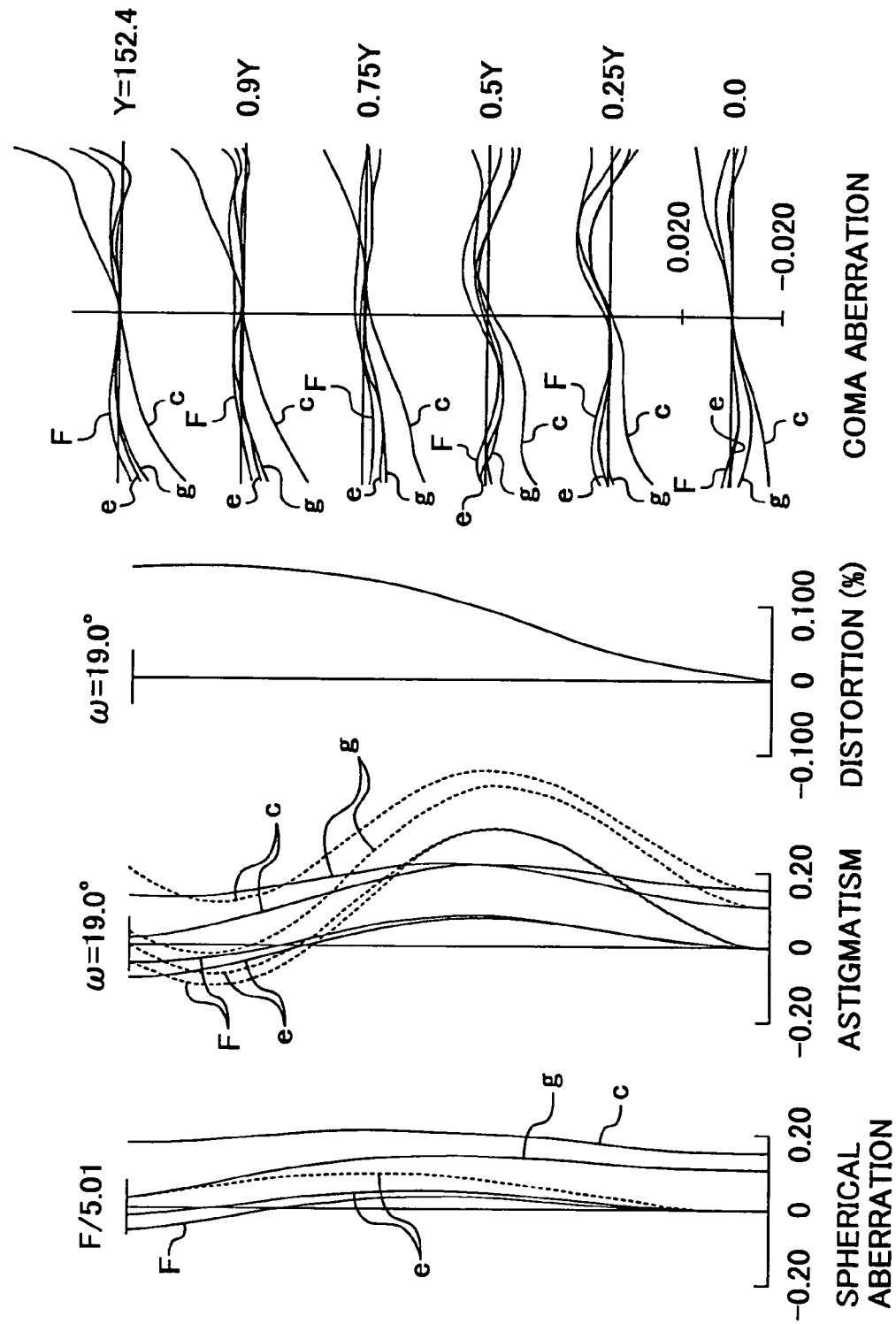
FIG. 10 is a view for showing some aberrations for the fifth embodiment.

FIG. 10 shows a view for some aberrations in the fifth embodiment.

(Sixth Embodiment)

Figure 11:
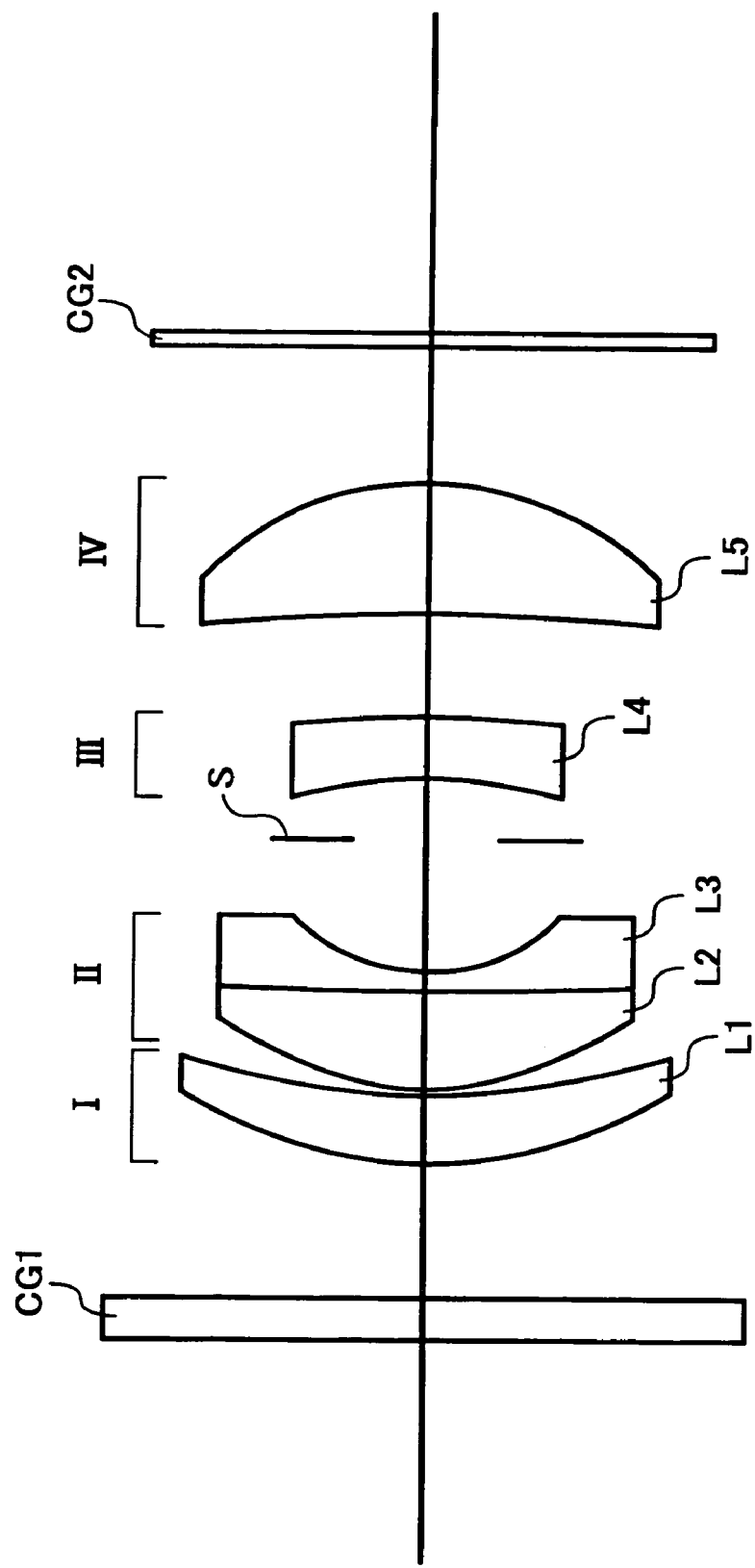
FIG. 11 is a view for explaining a construction of a lens for a sixth embodiment.

In FIG. 11 shows a constitution of a lens of the sixth embodiment. A original reading lens as shown in FIG. 11 has a first to a fourth lens groups sequentially arranged from an object side; the first lens group I is composed of the first lens L1 having a positive refracting power; a second lens group II having a negative refracting power is composed of a cemented lens, which is constructed by cementing a second lens L2 having a positive refracting power and a third lens L3 having a negative refracting power; an aperture stop S is disposed between the second and the third lens groups; a third lens group III is composed of a fourth lens L4 having a negative refracting power; and a fourth lens group IV is composed of a fifth lens L5 having a positive refracting power.

The original reading lens shown in FIG. 11 is different from the original reading lens shown in FIG. 1 in that the second lens group II is constructed by the cemented lens having the negative refracting power, and the fourth lens L4 of the third lens group III has the negative refracting power.

The second lens L2 and the third lens L3, which construct the cemented lens of the second lens group of FIG. 11, are meniscus lenses arranging convex faces directed to the object side.

Moreover, in the original reading lens as shown in FIG. 11, at least one surface of the fourth lens L4 is able to be an aspherical surface.

The original reading lens as shown in FIG. 11 satisfies the above mentioned conditions (1-3),(2-3), and (3-3). Effects to satisfy these conditions are as described as the original reading lens of FIG. 9.

Table 16 shows data of the sixth embodiment.

TABLE 16 f = 84.431,  F = 5.06,  m = 0.23622,  Y = 152.4,  ω = 19.0°

| | r | d | nd | νd | ne |
|---|---|---|---|---|---|
| c1 | 0.000 | 3.200 | 1.51680 | 64.2 | 1.51872 |
| c2 | 0.000 | | | | |
| 1 | 32.681 | 5.005 | 1.80557 | 39.85 | 1.81037 |
| 2 | 55.578 | 0.479 | | | |
| 3 | 24.784 | 7.269 | 1.76737 | 44.28 | 1.77149 |
| 4 | 366.816 | 1.500 | 1.64068 | 31.64 | 1.64547 |
| 5 | 13.947 | 9.985 | | | |
| 6 | 0.0 (aperture stop) | 4.445 | | | |
| 7 | −34.570 | 4.505 | 1.68893 | 31.16 | 1.69416 |
| 8 | −78.859 | 7.608 | | | |
| 9 | −172.041 | 10.000 | 1.48700 | 70.4 | 1.48866 |
| 10 | −22.788 | | | | |
| c3 | 0.000 | 1.000 | 1.51680 | 64.2 | 1.51872 |
| c4 | 0.000 | | | | |

Table 17 shows a conical constant and an aspherical coefficient of the sixth embodiment.

TABLE 17

< aspherical coefficient >

| surface number | K | A4 | A6 | A8 | A10 |
|---|---|---|---|---|---|
| 8 | −5.09883 | 8.00906E−06 | 1.09569E−08 | −8.25047E−11 | 3.25340E−13 |

Table 18 shows values for parameters of conditions in the sixth embodiment.

TABLE 18

< values of condition formulas >

| Item | Value |
|---|---|
| f1 | 89.162 |
| f1/f | 1.056 |
| $n_{\text{凸}} - n_{\text{凹}}$ | 0.022 |
| $\nu_{\text{凸}} - \nu_{\text{凹}}$ | 20.11 |

Figure 12:
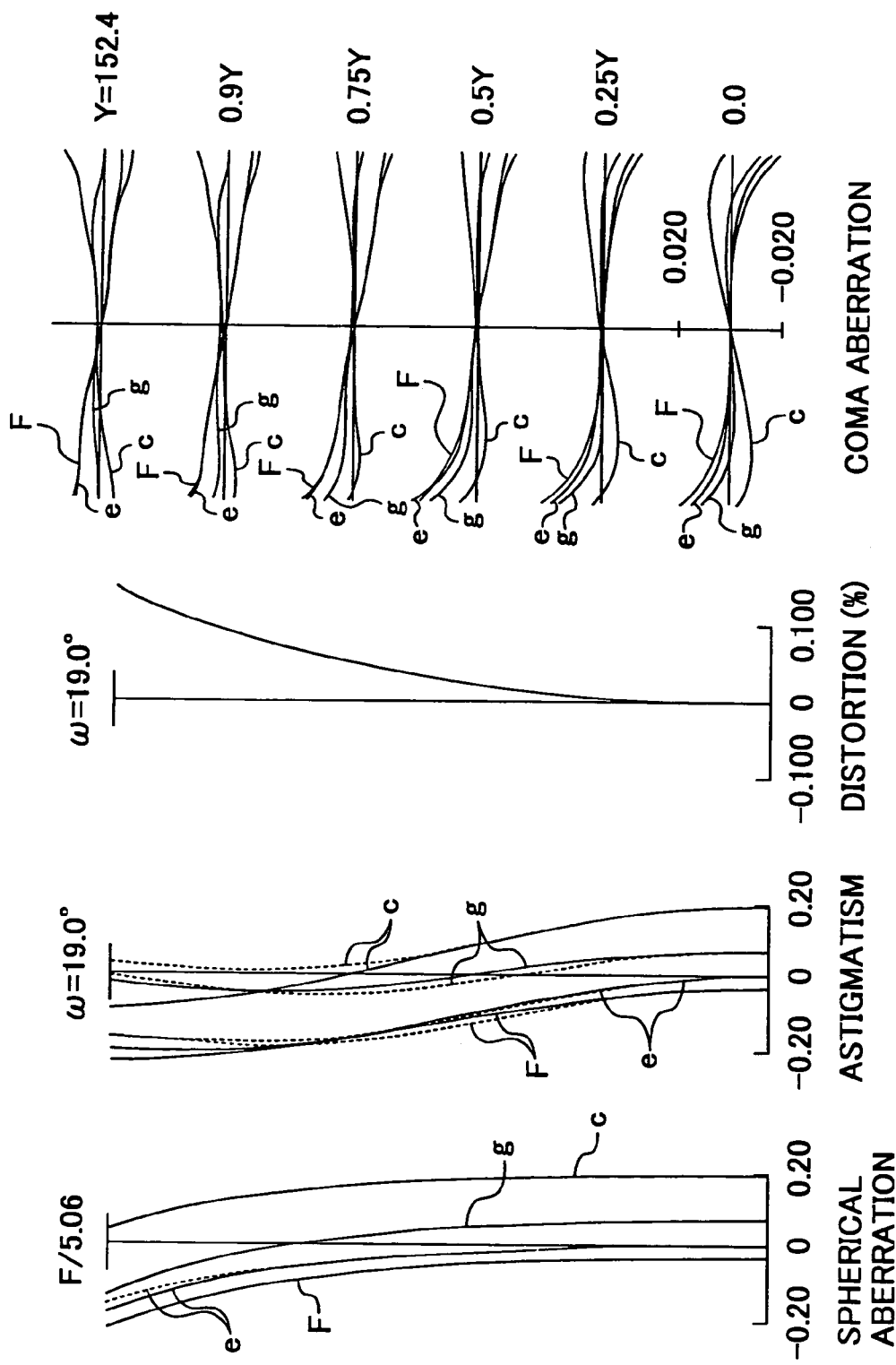
FIG. 12 is a view for showing some aberrations for the sixth embodiment.

FIG. 12 shows a view for some aberrations in the sixth embodiment.

(Seventh Embodiment)

Figure 13:
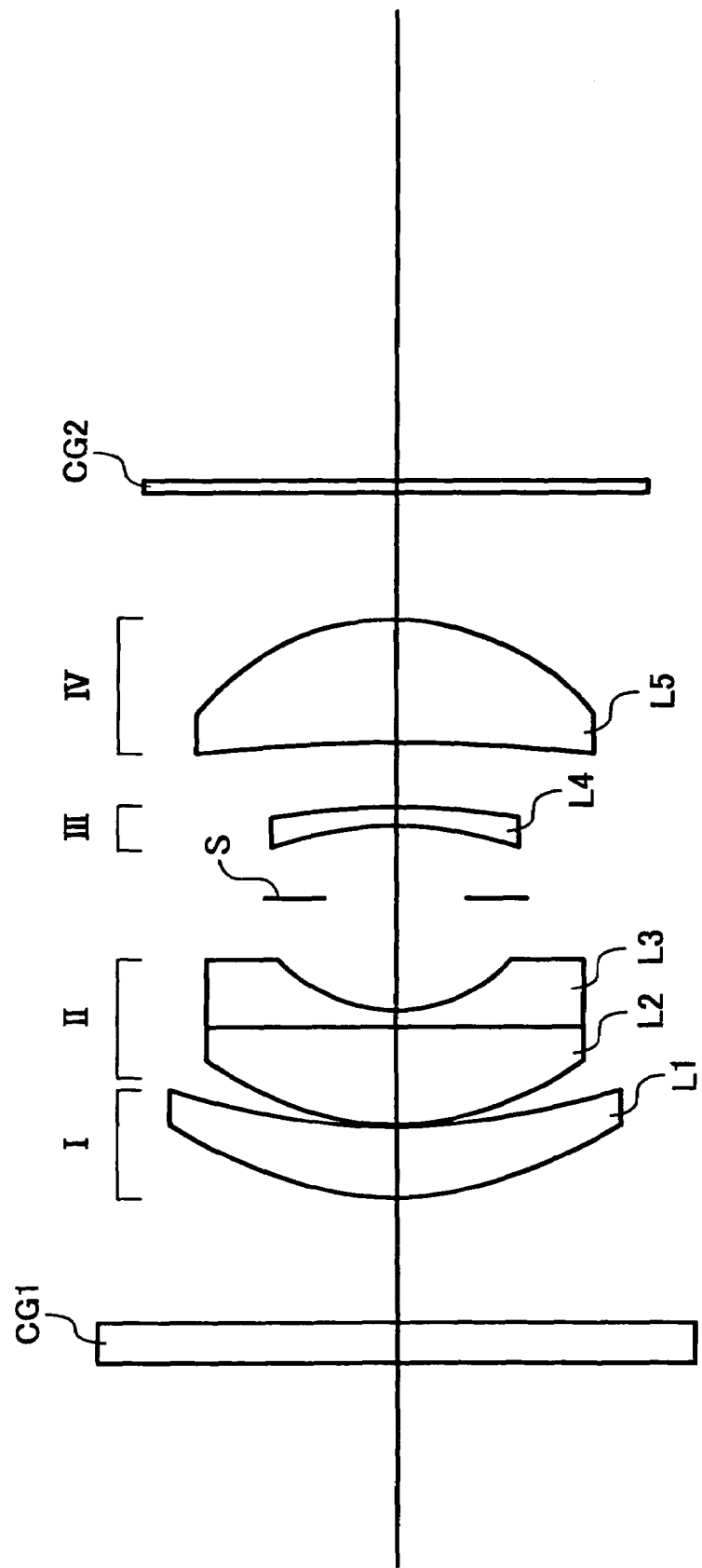
FIG. 13 is view for explaining a construction of a lens for a seventh embodiment.

FIG. 13 shows a construction of a lens in the seventh embodiment. The original reading lens in FIG. 13 has a first to a fourth lens groups as same as the original reading lens in FIG. 9 sequentially arranged from an object side; the first lens group I is composed of a first lens L1 having a positive refracting power; the second lens group II having a negative refracting power is composed of a cemented lens, which is constituted by cementing a second lens L2 having a positive refracting power and a third lens L3 having a negative refracting power; the aperture stop S is disposed between the second and the third lens groups; a third lens group III is composed of a fourth lens L4 having a negative refracting power; and a fourth lens group IV is composed of a fifth lens L5 having a positive refracting power.

The second lens L2 and the third lens L3, which construct the cemented lens of the second lens group, is a meniscus lenses arranging convex faces directed to the object side. In the original reading lens as shown in FIG. 13, at least one surface of the fourth lens L4 is able to be an aspherical surface.

In the embodiment 7, the aspherical surface is formed on the convex lens face of the fourth lens L4. As showing FIG. 13, the fourth lens L4 has a small diameter adjacent to the aperture stop S. The aspherical plane of the convex lens face of this fourth lens L4 is easy to be formed by a glass mold. Therefore, it is possible to lower a cost of the aspherical surface lens, and also it is effective for lowering a cost of the original reading lens. The original reading lens of FIG. 13 satisfies the above mentioned conditions (1-3),(2-3), and (3-3). The effects to satisfy these conditions are as mentioned above.

Table 19 shows data of the seventh embodiment.

TABLE 19

| $f = 84.285$, | $F = 4.95$, | $m = 0.23622$, | $Y = 152.4$, | $\omega = 19.1°$ |
|---|---|---|---|---|
| | r | d | nd | vd | ne |
| c1 | 0.000 | 3.200 | 1.51680 | 64.2 | 1.51872 |
| c2 | 0.000 | | | | |
| 1 | 29.667 | 5.777 | 1.71300 | 53.94 | 1.71615 |
| 2 | 58.075 | 0.100 | | | |
| 3 | 23.951 | 7.719 | 1.72342 | 37.99 | 1.72793 |
| 4 | 3743.417 | 1.500 | 1.67270 | 32.17 | 1.67764 |
| 5 | 12.917 | 8.853 | | | |
| 6 | 0.0 (aperture stop) | 5.980 | | | |
| 7 | −29.479 | 1.500 | 1.68893 | 31.16 | 1.69416 |
| 8 | −55.585 | 5.280 | | | |
| 9 | −128.284 | 10.000 | 1.48749 | 70.44 | 1.48914 |
| 10 | −19.790 | | | | |
| c3 | 0.000 | 1.000 | 1.51680 | 64.2 | 1.51872 |
| c4 | 0.000 | | | | |

Table 20 shows a conical constant and an aspherical coefficient an aspherical surface of the seventh embodiment.

TABLE 20

| | < aspherical coefficient > | | | | |
|---|---|---|---|---|---|
| surface number | K | A4 | A6 | A8 | A10 |
| 8 | −8.35253 | 5.89609E−06 | 1.95474E−08 | −4.66956E−11 | 1.51034E−13 |

Table 21 shows values of parameters of conditions in the seventh embodiment.

TABLE 21

| < values of conditions formulas > | |
|---|---|
| Item | Values |
| f1 | 78.060 |
| f1/f | 0.926 |
| $n_A - n_B$ | −0.040 |
| $v_A - v_B$ | 22.46 |

Figure 14:
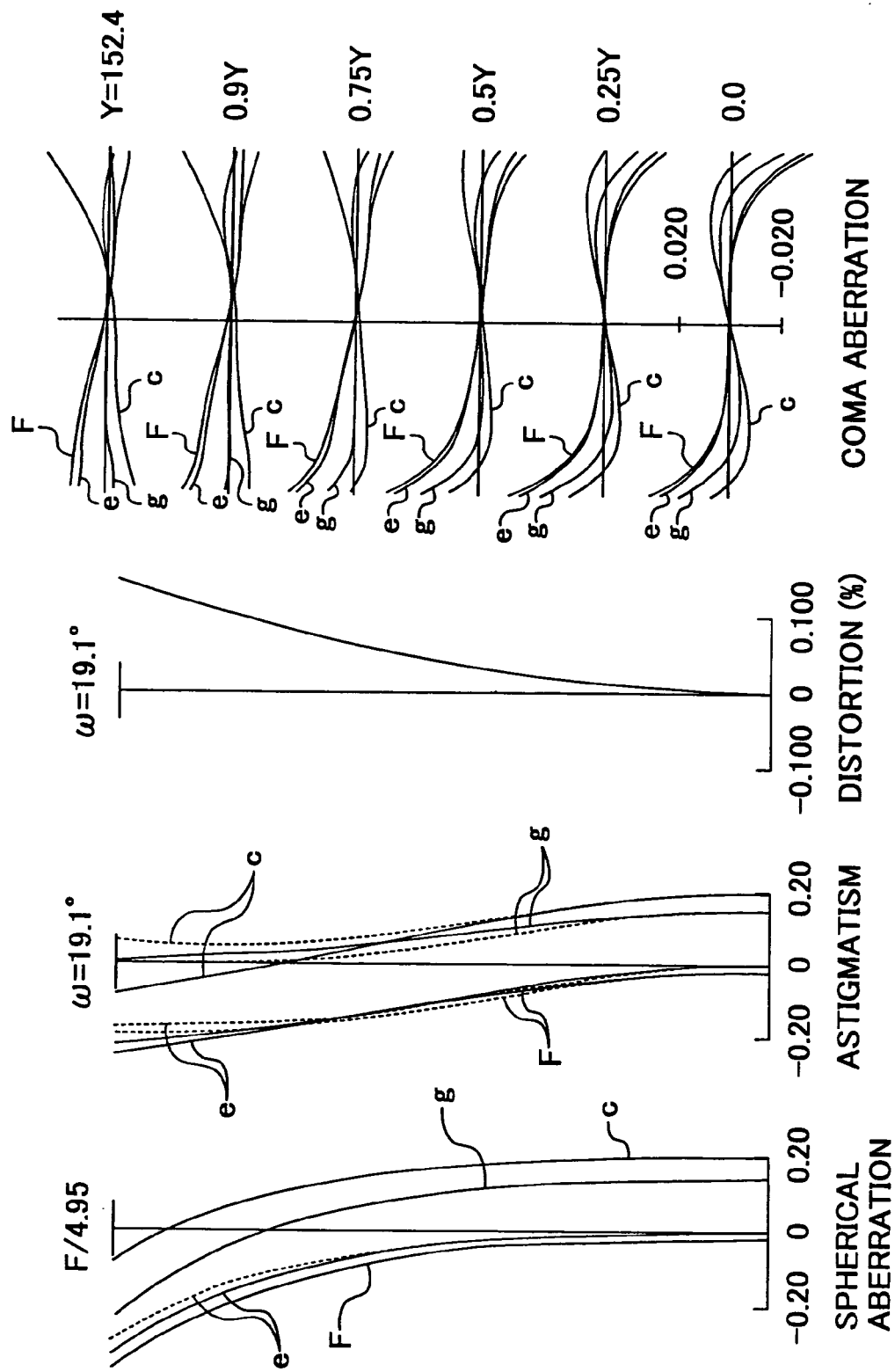
FIG. 14 is a view for showing some aberrations for the seventh embodiment.

FIG. 14 shows a view for some aberrations about the seventh embodiment.

In the above described every embodiments 1 to 7, as showing each view of FIGS. 2,4,6,7,8,10,12, and 14, the lenses have a blight F-number of about F/No 4.4 to 5.0. An aperture efficiency is practically 100% until a peripheral portion of an image. A plurality of aberrations is successfully collected, and a high contrast in a high spatial frequency area is included. Moreover it is possible to correspond appropriately to read an image with a full-color.

The original reading lenses in the embodiments 1 to 7 use glass lenses for all five lenses, and it is possible to form the aspherical surface by use of the glass mold. When forming the aspherical surface by the glass mold, it is preferable to form the convex lens face in terms of an easiness of forming. Moreover, the original reading lenses of the embodiments 1 to 7 use the glass lenses for all the five lenses, and it is possible to form the aspherical surface on the convex lens face of the fourth lens by the glass mold.

In the above mentioned every original reading lens, a temperature is tend to be raised by an influence of a heat of a lamp for illuminating an original. In order to have a stable performance with respect to these temperature fluctuations, it is better for the first to the fifth lenses L1 to L5 to have the glass lenses. In this case, it is better to form the aspherical surface by use of the glass mold.

The original reading lenses of the above embodiments 1 to 7 are able to be applied to a device for reading an original and an image forming apparatus. This device for reading an original is able to be constructed by use of any one of the original reading lens shown in the embodiments 1 to 7. The original reading lens, which includes an illumination system to illuminate an object, an image-forming lens to reduce and image a reflected light by the original illuminated by this illumination system, and a line-sensor to conduct a photo-electric transfer for an image of an original image imaged by this image-forming lens, is constructed by use of any one of the original reading lens shown in the embodiments 1 to 7 as an image-forming lens.

This device for reading an original may be the device, which includes a device or an element capable of decomposing a color on an optical path of an optical system, and reads the original image with a full-color. In other words, the device for reading an original is possible to have one or a plurality of devices for decomposing a color or elements for decomposing a color on the optical path of the optical system to read the original image with the full-color. For example of a CCD or a CMOS image sensor, which include a color filter, is able to be used as this device for decomposing the color or the element for decomposing the color.

In this original reading lens, a method in which an original is disposed on a contact glass in plane; the original is illuminated in a slit like shape, a reflected light from an illumination portion is reduced and imaged on a line sensor by the original reading lens; and in a direction perpendicular to the longitudinal direction of the illumination portion of the slit like shape, an illumination portion and an original are relatively displaced and the original image is read by illuminating and scanning of a surface of the original is adopted. Therefore, any one of the lens described in the constitutions for arranging the lenses showing in the embodiments 1 to 7 and conditions (1-1) to (3-1) is able to be used.

In illuminating and scanning the surface of the original, this method for reading an original is capable of displacing the optical system by fixing the original. This method is able to be accomplished by constructing any one of the original or the optical system or the both relatively transferable as transferring the original by fixing the optical system.

About the illumination with respect to the original in this method for reading an original, it is preferable to illuminate that when illuminating in the slit like shape with respect to the original on the contact glass, a degree of illumination in an illumination portion increases from a center portion of the slit toward both ends portion of a longitudinal direction of the slit. By adopting this illuminating method, it is possible to image an image, which has a small change of the degree of illumination in the longitudinal direction of the line sensor.

Figure 15:
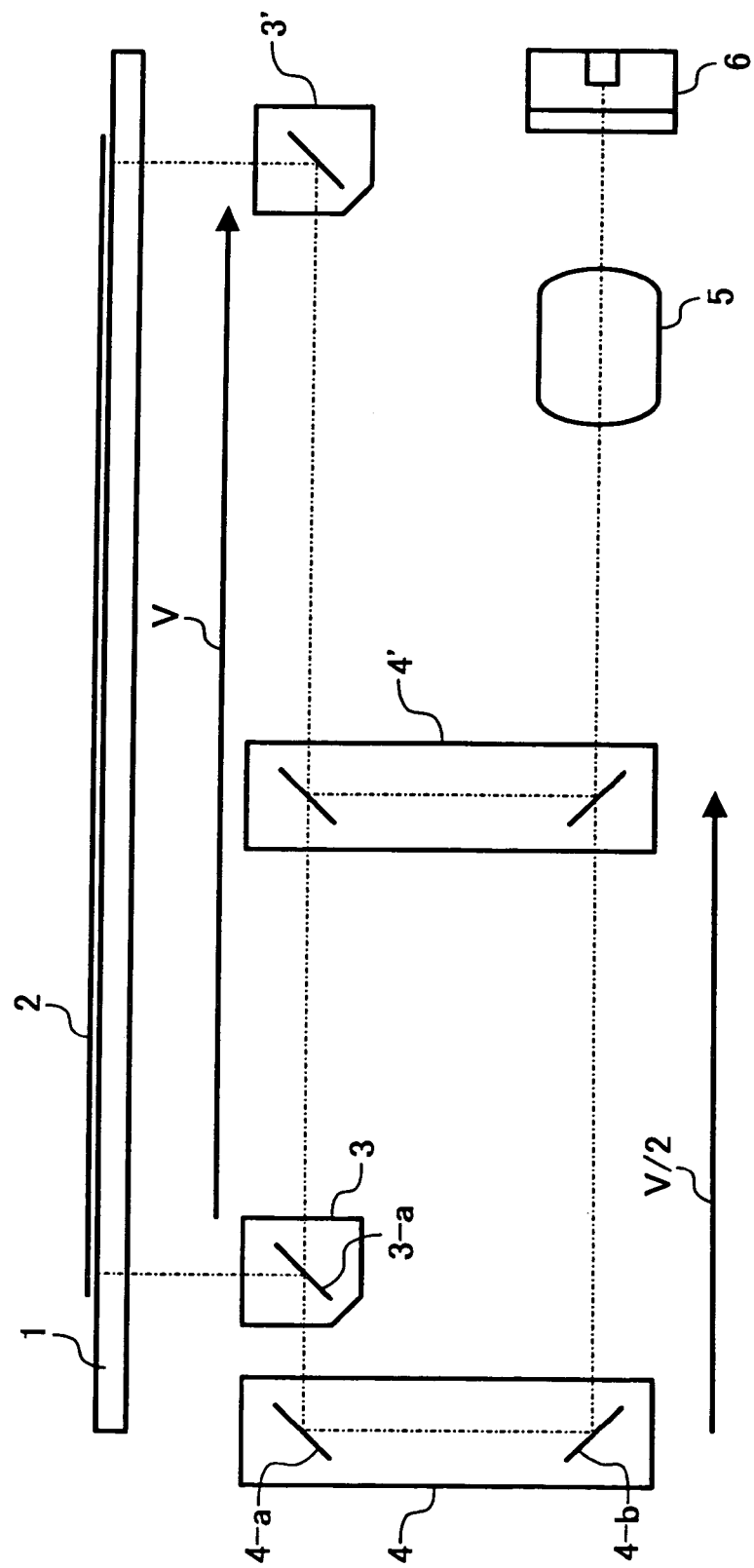
FIG. 15 is a view for explaining one embodiment of an apparatus for reading an original.

FIG. 15 shows an embodiment of an original reading lens having the original reading lens described in FIGS. 1 to 14.

An original 2 is disposed to a contact glass 1, and illuminated in a long slit like shape in a direction perpendicular to the view by an illumination optical system arranged under the contact glass 1. This illumination optical system (not shown) is constructed by a device of a lamp illumination (for example a fluorescent) provided in a first running body 3 as extending in the direction perpendicular to the view of FIG. 15. However, it is possible to use a device for light scanning to illuminate a laser such as an image forming apparatus.

A reflected light by the illuminated original 2 is reflected on a first mirror 3-a of the first running body 3. After that the light is reflected on a first mirror 4-a and a second mirror 4-b of a second running body 4, and led to a original reading lens 5, then the light is imaged as a reduced small image on a line sensor 6 by the original reading lens 5.

About a reading for the original 2, a constant optical path length, which exists from the surface of the original to the original reading lens, is maintained by moving the first running body 3 till a position 3' with a speed V, and at the same time, by moving the second running body 4 till a position 4' with a speed V/2.

In other words, this original reading lens has the above illumination optical system to illuminate the original, an image-forming lens 5 for reducing and imaging the reflected light of the original by this illumination optical system, and a line sensor 6 to conduct a photoelectric transfer for the image of the original image imaged by this image-forming lens, and it is the original reading lens, which uses any one of the original reading lens from FIGS. 1 to 14 as the image-forming lens 5.

This original reading lens has a function for decomposing a color in the optical path of the optical system, and is adopted to read image information of the original with a full-color. In this embodiment, the device or the element for decomposing a color is constructed by the line sensor 6. This line sensor 6 is a 3-line CCD in which a light receiving element having a filter for decomposing colors of R(red), G(green), and B(blue) is arranged in three lines in one chip. This line sensor 6 carries out the decomposing the colors into three colors by forming a color image on the surface of the received light. Therefore, it is possible to read a color original with a full-color.

Beside the above mentioned device and element, a device for decomposing a color by inserting selectively a filter or a prism for decomposing a color between the original reading lens 5 and the line sensor 6, a device for illuminating an original by flushing sequentially three colors light sources of R (red), G (green), and B (blue), and so on and some known methods, devices, or elements are included as the devices or the elements for decomposing a color.

In other words, in the original reading lens of FIG. 15, the method that the original 2 is put on the contact glass 1; the original 2 is illuminated in the slit like shape; the reflected light from the illumination portion is reduced and imaged on the line sensor 6 by the original reading lens 5; and in the direction perpendicular to the longitudinal direction of the illumination portion of the slit like shape (horizontal directions of FIG. 15), the illumination portion and the original are relatively displaced and the original image is read by illuminating and scanning the surface of the original is adopted. The device utilizes any one of the original reading lens shown in FIGS. 1 to 14 as the original reading lens.

The slit like shaped illumination with respect to the original 2 on the contact glass 1 is carried out in such a manner that the degree of illumination is increased toward the both end portion in the longitudinal direction of the slit from the center of the slit in order to equalize the brightness of the image of the original image on the line sensor 6 in the longitudinal direction of the sensor. Moreover a correction of shading depending on needs is carried out in order to equalize the brightness of the image of the original image.

The original reading lens of the above mentioned embodiments 1 to 7 are able to apply to the device for reading an original and the image forming apparatus. This image forming apparatus is the image forming apparatus in which the image information is imaged as the image, and has any one of the above mentioned device for reading an original as the device for reading an original to read the original image in order to change the original image into the image information. This image forming apparatus may be the apparatus, which conducts the image forming by writing the image information into a photosensitive media with a light scanning.

Consequently, this image forming apparatus has a device to write the image information into the photosensitive media by the light scanning. Specifically, this image forming apparatus has a device that an electrostatic latent image is written in a photoconductor with the light scanning by use of a photoconductive photoconductor formed as a cylinder shape, and a toner having a prescribed color is adhered to the electrostatic latent image written in the photoconductor, then the color toner of the photoconductor is fixed and visualized. This prescribed color is composed of a plurality of colors.

Figure 16:
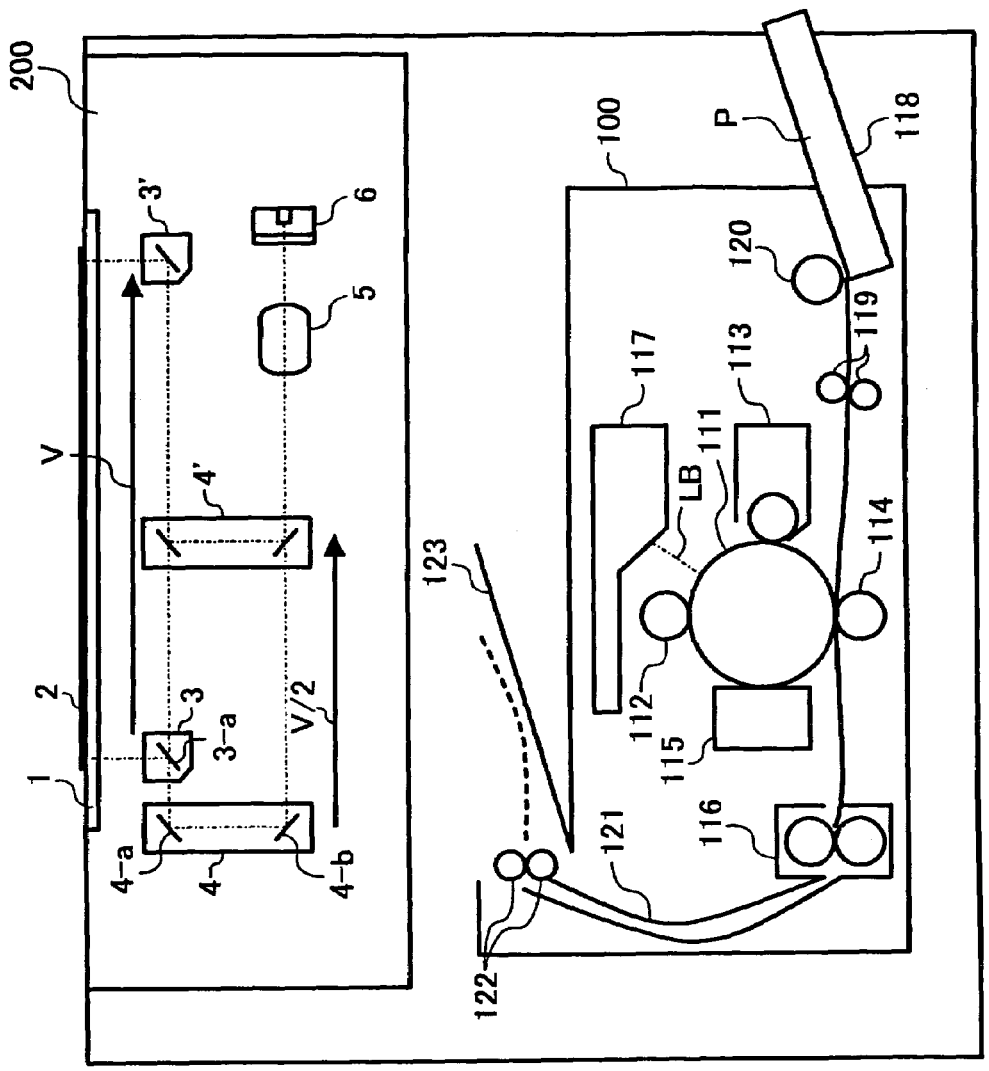
FIG. 16 is a view for explaining one embodiment of an image forming apparatus.

FIG. 16 shows one embodiment of an image forming apparatus.

This image forming apparatus has a device for reading an original 200 and a laser printer of an image forming part 100. The device for reading an original 200 outputs the original image of the original 2 as an electronic signal by the line sensor 6 in accordance with the construction and the operations as described in FIG. 15. The original reading lens 5 is selected voluntarily from the above embodiments 1 to 7 as the original reading lens.

The image forming part 100 has a photoconductive photoconductor 111 formed in a cylinder shape as a photosensitive media. A periphery of the photoconductor 111 is provided with an electrification roller 112 as an electrification device, a development device 113, a transfer roller 114, and a cleaning device 115. A corona-charger is able to be used as the electrification device.

Moreover, the image forming part 100 is provided with a light scanning device 117 to carry out the light scanning with a laser beam LB by receiving image information from the line sensor 6, and is adapted to conduct an exposure by an optical writing between the electrification roller 112 and the development device 113.

Reference numeral 116 denotes a fixing device, reference numeral 118 a cassette, reference numeral 119 a pair of resist rollers, reference numeral 120 a paper feeding, reference numeral 121 a transport path, reference numeral 122 a pair of ejection rollers, reference numeral 123 a tray, and reference numeral P a transfer paper as a recording medium.

When the image forming is carried out, the photoconductor 111 of the photoconductivity is rotated at a constant speed in clockwise in FIG. 16, and the surface is equally charged by the electrification roller 112, then the electrostatic latent image is formed by receiving the exposure by the optical writing of the laser beam LB of the light scanning device 117. The formed electrostatic latent image is a negative latent image, and the image part is exposed.

This electrostatic latent image is reversely developed by the development device 113, and the toner image is formed on the photoconductor 111. The cassette 118 in which the transfer paper P is contained is detachable to a body of the image forming apparatus 100, and as disposing in the view, one sheet of a top of the contained transfer paper P is fed by the paper feeding 120, and the leading end portion of the transfer paper P is caught by the pair of the resist rollers 119.

The pair of the resist rollers 119 sends the transfer paper P to the transfer part in timing with moving the toner image on the photoconductor 111 to a transfer position. The sent transfer paper P is overlapped with the toner image in the transfer part, and the toner image is electrostatic-transferred by an operation of the transfer roller 114. The transfer paper P in which the toner image is transferred is sent to the fixing device 116, and the toner image is fixed in the fixing device 116, and ejected on the tray 123 by the pair of the ejection rollers 122 through the transport path 121.

After the toner image is transferred, the surface of the photoconductor 111 is cleaned by the cleaning device 115, and a residual of the toner, a powder of the paper, and so on are eliminated.

Consequently, the image forming apparatus in FIG. 16 is the image forming apparatus to form the image information as the image, has the device for reading an original as the device for reading an original 200 to read the original image in order to change the original image to the image information, conducts the image forming by writing the image information to the photoconductor 111 with the light scanning, uses the photoconductive photoconductor 111 as a photosensitivity media so as to visualizes the electrostatic latent image, which is written by the light scanning, with the prescribed color of toner.

The image forming apparatus of FIG. 16 is to form an image of a monochrome; however, the device for reading an original 200 is able to conduct the reading for an original with a full-color. For example, a color image is able to be formed by carrying out as follows.

In other words, instead of the development device 113, by use of a known revolver type development device in connection with a color image forming apparatus, the photoconductor 111 is formed with an electrostatic latent image in which each image information (yellow, magenta, cyan-color image information) decomposed into R, G, and B and black image information are sequentially written and corresponded, and these are visualized by each color of toner such as yellow, magenta, cyan, and black. The color image which is produced by this is transferred and fixed on the transfer paper P.

In this case, the toner image of the above each color is sequentially formed on the photoconductor 111, and the toner image is transferred to an intermediate transfer media (transfer belt, and so on) at every time forming the toner image, then the toner image is possible to be transferred to the transfer paper after forming the color image by overlapping on the intermediate transfer media. Moreover, it is possible for an image forming part to be constructed as the know tandem image forming part of electro-photography process.

As described above, the novel original reading lens, the method and the device for reading an original, and the image forming apparatus are able to be accomplished by the present invention.

As being apparent from the views for some aberrations of each embodiment, in the lens for reading the original of this invention, regardless of small number of lenses such as the four groups for the five lenses, F-number is the relatively large aperture such as 4.4 to 5.0, the aperture efficiency is practically 100%, the reduced magnification is about 0.236, the chromatic aberration is preferably corrected, the aberrations on the axis and off the axis are well balanced, the distorting is extremely preferably corrected, the high contrast in the high spatial frequency area is included as being obvious from the coma aberration, and it is possible to accomplish with the low cost.

By use of this original reading lens, not only archiving favorable method and a device for reading an original in which a variation in SN ratio is small when original information is a monochrome, but also archiving a favorable method for reading an original and a device in which a variation in SN ratio of each color such as red, green, and blue is small even an original image is a full-color. The image forming apparatus, which is capable of forming a favorable image forming with a low cost and a compact, is able to be accomplished by use of this device for reading an original.

The invention claimed is:

1. A reading lens comprising:
   five lenses including at least two positive lenses and two negative lenses, wherein
   the five lenses include a positive first lens, a positive second lens, a negative third lens, a negative fourth lens and a positive fifth lens sequentially arranged from the object side of the reading lens, the positive second lens and the negative third lens are cemented as a single cemented lens having a negative refracting power, an aperture stop is disposed between the negative third lens and the negative fourth lens, the negative fourth lens includes an aspherical lens, a curvature radius of a first surface of the aspherical lens on an object side of the aspherical lens is r1$a$, a curvature radius of a second surface of the aspherical lens on an image side of the aspherical lens is r2$a$, and r1$a$ and r2$a$ satisfy:

$1.4 < r2a/r1a < 2.3$.

2. The reading lens according to claim 1, wherein a focal length of an e line of the first lens is f1, a combined focal length of an e line of the reading lens is f, an average of a refractive index of a d line of all positive lenses is n convex, an average of a refractive index of a d line of all negative lenses is n concave, an average of an Abbe's number of all positive lenses is ν convex, an average of an Abbe's number of all negative lenses is ν concave and:

$0.54 < f1 < f < 1.14$, $-0.16 < n$ convex$-n$ concave$< 0.05$, and $18.11 < \nu$ convex$-\nu$ concave$< 32.13$.

3. An image reading device, comprising:

an illumination system configured to illuminate an original;

a reading lens configured to image a reflection light of an original image of the original illuminated by the illumination system, the reading lens comprising:

five lenses including at least two positive lenses and two negative lenses, wherein the five lenses include a positive first lens, a positive second lens, a negative third lens, a negative fourth lens and a positive fifth lens sequentially arranged from the object side of the reading lens, the positive second lens and the negative third lens are cemented as a single cemented lens having a negative refracting power, an aperture stop is disposed between the negative third lens and the negative fourth lens, the negative fourth lens includes an aspherical lens, a curvature radius of a surface of the aspherical lens on an object side of the aspherical lens is r1$a$, a curvature radius of the aspherical lens on an image side of the aspherical lens is r2$a$, and r1$a$ and r2$a$ satisfy:

$1.4 < r2a/r1a < 2.3$; and a line sensor configured to photoelectrically convert the original image imaged by the reading lens for reading the original.

4. The image reading device according to claim 3, further comprising:

a color separation unit configured to read information of the original image with a full range of colors.

5. An image forming device, comprising:

a photosensitive medium for forming an image by writing an image information with a light scanning; and an image reading device comprising:

an illumination system configured to illuminate an original;

a reading lens configured to image a reflection light of an original image of the original illuminated by the illumination system, the reading lens comprising:

five lenses including at least two positive lenses and two negative lenses, wherein the five lenses include a positive first lens, a positive second lens, a negative third lens, a negative fourth lens and a positive fifth lens sequentially arranged from the object side of the reading lens, the positive second lens and the negative third lens are cemented as a single cemented lens having a negative refracting power, an aperture stop is disposed between the negative third lens and the negative fourth lens, the negative fourth lens includes an aspherical lens, a curvature radius of a surface of the aspherical lens on an object side of the aspherical lens is r1$a$, a curvature radius of the aspherical lens on an image side of the aspherical lens is r2$a$, and r1$a$ and r2$a$ satisfy:

$1.4 < r2a/r1a < 2.3$;

a line sensor configured to photoelectrically convert the original image imaged by the reading lens for reading the original; and a color separation unit configured to read information of the original image with a full range of colors.

* * * * *